United States Patent
Misawa et al.

(10) Patent No.: US 6,383,637 B1
(45) Date of Patent: May 7, 2002

(54) BLACK MAGNETIC IRON OXIDE PARTICLES FOR MAGNETIC TONER AND PROCESS FOR PRODUCING THE SAME

(75) Inventors: Hiromitsu Misawa, Hatsukaichi; Koso Aoki, Hiroshima; Suehiko Miura, Hiroshima; Minoru Kozawa, Hiroshima; Naoki Uchida, Otake; Nobuya Shimo, Hiroshima, all of (JP)

(73) Assignee: Toda Kogyo Corporation, Hiroshima-ken (JP)

(*) Notice: Subject to any disclaimer, the term of this patent is extended or adjusted under 35 U.S.C. 154(b) by 0 days.

(21) Appl. No.: 09/549,183

(22) Filed: Apr. 13, 2000

(30) Foreign Application Priority Data

Apr. 16, 1999 (JP) ............................................ 11-109943

(51) Int. Cl.[7] ................................................. B32B 5/16
(52) U.S. Cl. ....................... 428/403; 428/407; 428/195; 428/199; 428/208; 428/694 BA; 428/694 BH; 428/900; 430/106.6; 430/108; 430/111
(58) Field of Search ................... 428/694 BA, 694 BH, 428/403, 407, 900, 208, 195, 199; 430/106.6, 111, 108

(56) References Cited

U.S. PATENT DOCUMENTS

| | | | | |
|---|---|---|---|---|
| 4,946,755 A | * | 8/1990 | Inoue | 430/106.6 |
| 5,143,810 A | * | 9/1992 | Nozawa | 430/106.6 |
| 5,296,326 A | * | 3/1994 | Taya | 430/106.6 |
| 5,354,637 A | * | 10/1994 | Shimamura | 430/106.6 |
| 6,051,352 A | * | 4/2000 | Umeno | 430/106.6 |

FOREIGN PATENT DOCUMENTS

| | | |
|---|---|---|
| EP | 0449326 A1 | 10/1991 |
| JP | 03201509 | 9/1991 |
| JP | 09175824 | 7/1997 |

* cited by examiner

Primary Examiner—Leszek Kiliman
(74) Attorney, Agent, or Firm—Nixon & Vanderhye (57) ABSTRACT

Black magnetic iron oxide particles of the present invention having an average particle diameter of 0.1 to 0.3 μm, comprise:

black spinel iron oxide particles as core particles; and a surface coat formed on the surface of each core particle, comprising fine spinel iron oxide particles, the content of FeO in a surface layer having a thickness of from a surface of each black magnetic iron oxide particle to about 3.5% per a radius of each black magnetic iron oxide particle, being 8 to 14% by weight based on the weight of Fe contained in said surface layer.

Such black magnetic iron oxide particles not only have a sufficient blackness and excellent electrical properties, flowability and electrification property (charging property), but also exhibit a good compatibility with binder resins such as aromatic vinyl-based resins, acrylic-based resins and copolymer resins thereof, and a good dispersibility in these resins for a magnetic toner.

18 Claims, 1 Drawing Sheet

FIG.1

BLACK MAGNETIC IRON OXIDE PARTICLES FOR MAGNETIC TONER AND PROCESS FOR PRODUCING THE SAME

BACKGROUND OF THE INVENTION

The present invention relates to black magnetic iron oxide particles and a process for producing the black magnetic iron oxide particles, and more particularly, to black magnetic iron oxide particles not only having a sufficient blackness and excellent electrical properties, flowability and electrification property (charging property), but also exhibiting a good compatibility with binder resins such as aromatic vinyl-based resins, acrylic-based resins and copolymer resins thereof, and a good dispersibility in these resins for a magnetic toner, a process for producing the particles, and a magnetic toner using the black magnetic iron oxide particles.

Hitherto, as one of electrostatic latent image development methods, there is well known a development method using a so-called one component magnetic toner as a developer, which contains no carrier and comprises composite particles obtained by mixing and dispersing black magnetic iron oxide particles such as magnetite particles in resins.

With recent tendency toward high speed and high image quality in laser beam printers or digital copying machines, it has been strongly demanded to improve properties of a magnetic toner used therein as a developer. For this reason, the magnetic toner has been required to show not only an improved electrification property and a high flowability, but also stable charging amount and flowability even upon change in environmental conditions such as temperature or humidity.

Due to the fact that the electrification property of the magnetic toner has a close relationship to electrical properties of black magnetic iron oxide particles used therein, it has been strongly demanded to provide black magnetic iron oxide particles having excellent electrical characteristics.

Thus, it has been required that the properties of the black magnetic iron oxide particles are further improved in order to enhance the electrification property of the magnetic toner.

More specifically, in order to obtain a magnetic toner having an excellent electrification property, it is necessary that the black magnetic iron oxide particles used therein have a sufficient blackness, a higher dispersibility and more excellent electrical properties.

In "POWDER AND POWDER METALLURGY", vol. 26, No. 7, pp. 239–240, it is described that "the degree of blackness of the specimen varies depending upon the content of Fe(II) and the average particle diameter, and particles having an average particle diameter of 0.2 $\mu$m are bluish black and, therefore, are most suitable as black pigments . . . when the content of Fe(II) is not less than 10%, all specimens exhibit a black color though the degrees of blackness thereof are slightly different from each other, and when the content of Fe(II) is reduced to less than 10%, the color of the specimen is changed from black to reddish brown". As described in the above literature, it is known that the properties of black magnetic iron oxide particles for magnetic toner having a particle diameter of about 0.1 to about 0.5 $\mu$m, varies depending upon mainly the content of $Fe^{2+}$ (FeO). Thus, the black magnetic iron oxide particles have been required to have a large FeO content and a high blackness.

The dispersibility of the black magnetic iron oxide particles largely depends upon the surface conditions thereof. Therefore, in order to improve the surface conditions of the black magnetic iron oxide particles and to enhance the dispersibility thereof, it has been attempted to coat surfaces of the black magnetic iron oxide particles with a silicon compound or an aluminum compound. In addition, the black magnetic iron oxide particles tend to be magnetically agglomerated due to fineness thereof, resulting in the deterioration of the blending property with resins. Consequently, it has been required to prevent the black magnetic iron oxide particles from being magnetically agglomerated.

Also, the electrification property of the magnetic toner largely depends upon the surface conditions of the black magnetic iron oxide particles exposed to the surface of the magnetic toner. In particular, FeO contained in the black magnetic iron oxide particles acts for reducing an electrical resistance of the magnetic toner, so that the electrification property of the magnetic toner is considerably influenced by the content of FeO and the distribution of FeO in each particle. In this regard, Japanese Patent Application Laid-Open (KOKAI) No. 4-338971 describes that "the distribution condition of Fe(II) in the surface layer of magnetic iron oxide more highly contributes to stable frictional electrification property of the obtained toner under various environmental conditions rather than the FeO content therein".

As described above, in order to enhance the dispersibility and electrical properties of the black magnetic iron oxide particles, it is necessary to optimize the FeO content and the abundance of FeO in the surface layer of each black magnetic iron oxide particle.

The magnetic toner has been produced by mixing the magnetic particles with aromatic vinyl resins such as styrene resins or vinyl toluene resins, acryl-based resins such as acrylic resins or methacrylic resins, and copolymer resins thereof. Therefore, the magnetic particles have been required to have an excellent dispersibility in these resins.

In the production of the magnetic toner, when the magnetic particles are kneaded with resins, it is difficult to sufficiently disperse the magnetic particles in resins since the magnetic particles have a hydrophilic surface, so that the magnetic particles are present in the form of agglomerated particles in resins after the kneading. When the non-uniform mixture is pulverized into such a size as required for a magnetic toner, there arise problems such as generation of a magnetic powder from agglomerated particles upon the pulverization or different contents of the magnetic particles in individual toner particles, thereby failing to obtain particles having excellent properties as a magnetic toner.

Consequently, in order to improve the surface conditions of the magnetic particles and to enhance the dispersibility thereof, it has been attempted to coat the surfaces of the magnetic particles with various coupling agents such as silane-based coupling agents and titanium-based coupling agents, or various metal compounds such as aluminum compounds and silicon compounds. Also, the magnetic particles are fine particles and, therefore, tend to be magnetically agglomerated together, resulting in deteriorated blending property with resins. Therefore, it has been required to inhibit the magnetic particles from being magnetically agglomerated together.

The flowability of the magnetic toner largely depends upon the surface conditions of the magnetic iron oxide particles exposed to the surface of the magnetic toner. Therefore, it has been required that the magnetic iron oxide particles themselves show an excellent flowability.

The magnetic toner tends to suffer from inherent drawbacks such as deteriorated flowability due to high resistance thereof. For this reason, it has been attempted to modify the surface of the magnetic toner or the surfaces of the magnetic particles contained in the magnetic toner, or enhance the flowability of the magnetic toner by adding external additives into the magnetic toner.

The magnetic toner is required to exhibit stable properties even upon any change in environmental conditions, for example, under high temperature and high humidity conditions or under low temperature and low humidity conditions. Thus, it has been strongly demanded to provide a magnetic toner capable of constantly showing stable flowability and charging amount.

Conventionally, it has been attempted to improve the dispersibility and electrical properties of the black magnetic iron oxide particles by limiting the FeO content thereof to a specific range (Japanese Patent Application Laid-Open (KOKAI) Nos. 58-189646(1983), 3-201509(1991), 4-338971(1992), 4-141664(1992) and 11-30877(1999)).

At present, it has been strongly demanded to provide black magnetic iron oxide particles for a magnetic toner, which can show not only a sufficient blackness but also excellent dispersibility and electrical properties. However, black magnetic iron oxide particles capable of fulfilling all of these properties simultaneously cannot be obtained until now. In particular, it has been most strongly demanded to provide black magnetic iron oxide particles for a magnetic toner which can show a sufficient blackness and excellent electrical properties as well as a good compatibility with binder resins such as aromatic vinyl-based resins, acrylic-based resins or copolymer thereof, and a good dispersibility in these magnetic toner resins. However, black magnetic iron oxide particles capable of fulfilling all of these properties simultaneously cannot be obtained until now.

That is, the conventional methods described in the above prior arts are classified into a method of production of particles in which the FeO content in whole black magnetic iron oxide particles is specified (Japanese Patent Application Laid-Open (KOKAI) Nos. 58-189646(1983), 3-201509 (1991) and 11-30877(1999)), and a method of production of particles in which the FeO content is increased from an outer surface of each particle toward a center thereof (Japanese Patent Application Laid-Open (KOKAI) Nos. 4-338971 (1992) and 4-141664(1992)). However, in any of these methods, the FeO content in a surface layer of each black magnetic iron oxide particle is large, so that the black magnetic iron oxide particles are unsatisfactory in electrical properties.

Further, in the methods described in the above prior arts, the FeO content is adjusted to the specified range by subjecting the black magnetic iron oxide particles to dry treatment under controlled conditions of dry atmosphere and drying temperature during the production process therefor. However, these methods fail to obtain such black magnetic iron oxide particles having a less FeO content only in a surface layer thereof.

Also, it has been attempted to enhance the flowability of the black magnetic iron oxide particles by using conventional surface treatments. However, the attempt also fails to obtain such iron oxide particles for a magnetic toner having a less FeO content only in the surface layer thereof and exhibiting an excellent flowability.

Consequently, the technical subject to be solved by the present invention aims at not only improving a dispersibility and electrical properties of the black magnetic iron oxide particles, but also especially enhancing a flowability thereof.

As a result of the present inventors' earnest studies, it has been found that by (a) passing an oxygen-containing gas through an aqueous ferrous salt reaction solution containing ferrous hydroxide colloid obtained by reacting an aqueous ferrous salt solution with an aqueous alkali solution having an alkali concentration of less than one equivalent based on $Fe^{2+}$ contained in the said aqueous ferrous salt solution, to produce black spinel-type iron oxide particles as core particles; (b) successively passing an oxygen-containing gas through a reaction solution having a pH of 4.0 to 5.0 and containing the obtained black spinel-type iron oxide particles as core particles, to surface-oxidize the said core particles; (c) adding an aqueous alkali hydroxide solution to the reaction solution obtained after the surface-oxidation thereof, to adjust the pH of the said reaction solution to 7.0 to 8.0; (d) passing an oxygen-containing gas through the obtained reaction solution to form a surface coat comprising fine spinel-type iron oxide particles on the surface of each core particle; and (e) successively passing an oxygen-containing gas through the resultant reaction solution, to oxidize the said surface coat comprising fine spinel-type iron oxide particles, the obtained black magnetic iron oxide particles have not only a sufficient blackness and excellent electrical properties, but also excellent flowability and electrification property and a good dispersibility. The present invention has been attained based on the finding.

SUMMARY OF THE INVENTION

It is an object of the present invention to provide black magnetic iron oxide particles for a magnetic toner, which have a sufficient blackness and are excellent in dispersibility and electrical properties.

It is an object of the present invention to provide black magnetic iron oxide particles for a magnetic toner which not only have a sufficient blackness and excellent electrical properties, flowability and electrification property (charging property), but also exhibit a good compatibility with binder resins such as aromatic vinyl-based resins, acrylic-based resins and copolymer resins thereof, and a good dispersibility in these resins for a magnetic toner.

It is an object of the present invention to provide a magnetic toner which not only exhibits excellent electrification property and flowability, but also maintains the excellent electrification property and flowability stably for a long period of time.

To accomplish the aims, in a first aspect of the present invention, there are black magnetic iron oxide particles having an average particle diameter of 0.1 to 0.3 μm, comprising:

black spinel iron oxide particles as core particles; and
a surface coat formed on the surface of each core particle, comprising fine spinel iron oxide particles, the content of FeO in a surface layer having a thickness of from a surface of each black magnetic iron oxide particle to about 3.5% per a radius of each black magnetic iron oxide particle, being 8 to 14% by weight based on the weight of Fe contained in said surface layer.

In a second aspect of the present invention, there are black magnetic iron oxide particles having an average particle diameter of 0.1 to 0.3 μm, comprising:

black spinel iron oxide particles as core particles;
a surface coat formed on the surface of each core particle, comprising fine spinel iron oxide particles; and
a coating formed on the surface coat, comprising an organic compound having a hydrophobic group,
the content of FeO in a surface layer having a thickness of from a surface of each black magnetic iron oxide particle to about 3.5% per a radius of each black magnetic iron oxide particle, being 8 to 14% by weight based on the weight of Fe contained in said surface layer.

In a third aspect of the present invention, there are black magnetic iron oxide particles having an average particle diameter of 0.1 to 0.3 μm, comprising:

black spinel iron oxide particles as core particles;

a surface coat formed on the surface of each core particle, comprising fine spinel iron oxide particles; and a coating formed on the surface coat, comprising an aluminum compound and/or a silicon compound, the content of FeO in a surface layer having a thickness of from a surface of each black magnetic iron oxide particle to about 3.5% per a radius of each black magnetic iron oxide particle, being 8 to 14% by weight based on the weight of Fe contained in said surface layer.

In a fourth aspect of the present invention, there are black magnetic iron oxide particles having an average particle diameter of 0.1 to 0.3 μm, comprising:

black spinel iron oxide particles as core particles;

a surface coat formed on the surface of each core particle, comprising fine spinel iron oxide particles; and a coating formed on the ssurface coat, comprising fine particles of an oxide of at least one element selected from the group consisting of Al, Si, Zr and Ti, the content of FeO in a surface layer having a thickness of from a surface of each black magnetic iron oxide particle to about 3.5% per a radius of each black magnetic iron oxide particle, being 8 to 14% by weight based on the weight of Fe contained in said surface layer.

In a fifth aspect of the present invention, there is a process for producing the black magnetic iron oxide particles as defined in the first aspect, which process comprises:

(a) passing an oxygen-containing gas through an aqueous ferrous salt reaction solution containing ferrous hydroxide colloid obtained by reacting an aqueous ferrous salt solution with an aqueous alkali solution having an alkali concentration of less than one equivalent based on $Fe^{2+}$ contained in said aqueous ferrous salt solution, to produce a reaction solution having a pH of 4.0 to 5.0 and containing black spinel iron oxide particles as core particles;

(b) successively passing an oxygen-containing gas through said reaction solution to surface-oxidize said core particles;

(c) adding an aqueous alkali hydroxide solution to the reaction solution obtained after the surface-oxidation of the core particles to adjust the pH of said reaction solution to 7.0 to 8.0;

(d) passing an oxygen-containing gas through the resultant reaction solution, to form a surface coat comprising fine spinel iron oxide particles on the surface of each core particle; and (e) successively passing an oxygen-containing gas through the reaction solution to oxidize said surface coat comprising fine spinel iron oxide particles.

In a sixth aspect of the present invention, there is a magnetic toner comprising the black magnetic iron oxide particles as defined in the first aspect.

DETAILED DESCRIPTION OF THE INVENTION

The present invention is described in detail below.

First, the black magnetic iron oxide particles according to the present invention are explained.

The black magnetic iron oxide particles according to the present invention comprises black spinel iron oxide particles as core particles, and a surface coat formed on a surface of each core particle and composed of fine spinel iron oxide particles. The content of FeO in a surface layer having a thickness which extends radially inwardly from a surface of each black magnetic iron oxide particle and which is from the surface thereof to about 3.5% per a radius of each black magnetic iron oxide particle, is usually 8 to 14% by weight based on the weight of Fe contained in the surface layer.

Here, the "surface layer" of each black magnetic iron oxide particle according to the present invention is constituted by a surface-oxidized portion of each black spinel iron oxide particle as core particle, and the surface coat which is formed on the surface of the core particle and which is composed of fine spinel iron oxide particles. The thickness of the surface layer is equivalent to a depth of from the surface of each black magnetic iron oxide particle according to the present invention to about 3.5% per a radius of each black magnetic iron oxide particle.

When the thickness of the surface layer is too small, electrical properties of the black magnetic iron oxide particles may be deteriorated. When the thickness of the surface layer is too large, the black magnetic iron oxide particles may be insufficient in blackness and magnetic properties required for the magnetic toner.

For example, when the black magnetic iron oxide particle has a particle diameter of 0.2 μm, the surface layer thereof has a thickness equivalent to a depth of about 35 Å from the surface of the black magnetic iron oxide particle.

In the black magnetic iron oxide particles according to the present invention, the FeO content in the surface layer is usually 8 to 14% by weight based on the weight of Fe contained in the surface layer. When the FeO content is less than 8% by weight, it may be difficult to obtain black magnetic iron oxide particles having a sufficient blackness. When the FeO content is more than 14% by weight, the obtained black magnetic iron oxide particles may be deteriorated in electrical properties, so that the magnetic toner obtained therefrom may show a poor electrification property. The FeO content in the surface layer is preferably 9 to 13% by weight based on the weight of Fe contained in the surface layer.

The FeO content in a central portion of each black magnetic iron oxide particle, which is a remaining portion excluding the surface layer from black magnetic iron oxide particles according to the present invention, is preferably 27 to 34% by weight, more preferably 28 to 33% by weight.

Meanwhile, the average FeO content in the whole black magnetic iron oxide particles according to the present invention is preferably 18.0 to 22.5% by weight.

The black magnetic iron oxide particles according to the present invention have an average particle diameter of usually 0.1 to 0.3 μm. When the average particle diameter is less than 0.1 μm, a cohesive force between the black magnetic iron oxide particles may become large, resulting in poor dispersibility. When the average particle diameter is more than 0.3 μm, the number of the black magnetic iron oxide particles contained in one magnetic toner particle may be reduced, and there tends to be caused non-uniform distribution of the black magnetic iron oxide particles in the respective magnetic toner particles, resulting in non-uniformity in electrification property of the obtained magnetic toner. The average particle diameter of the black magnetic iron oxide particles is preferably 0.15 to 0.25 μm.

The black magnetic iron oxide particles according to the present invention comprise magnetite particles ((FeO)$_x$·Fe$_2$O$_3$ wherein x is more than 0 and not more than 1), and may further contain at least one metal element other than iron selected from the group consisting of Mn, Ni, Zn, Cu, Mg, Co and Ti, if required.

The black magnetic iron oxide particles according to the present invention have an aspect ratio (average major axial diameter/average minor axial diameter) of preferably less than 1.4:1. When the aspect ratio is not less than 1.4:1, the coercive force of the black magnetic iron oxide particles may become large, thereby disadvantageously increasing the magnetic coercive force between the particles. The aspect ratio is more preferably not more than 1.3:1. The lower limit thereof is preferably 1.0:1.

The black magnetic iron oxide particles according to the present invention have a BET specific surface area of preferably 5 to 15 m$^2$/g, more preferably 6.0 to 12.0 m$^2$/g.

The saturation magnetization value of the black magnetic iron oxide particles according to the present invention is preferably 81.0 to 86.0 AM$^2$/kg (81.0 to 86.0 emu/g), more preferably 82.0 to 85.0 Am$^2$/kg (82.0 to 85.0 emu/g).

The black magnetic iron oxide particles according to the present invention have a soluble sodium salt content of preferably not more than 100 ppm, more preferably not more than 50 ppm, and a blackness (a* value) of preferably not more than +1.0, more preferably not more than +0.8.

As to the degree of dispersion, the black magnetic iron oxide particles according to the present invention have a 44 μm mesh residue of preferably not more than 10%, more preferably not more than 6%.

The time required until reaching a saturated charging amount of the black magnetic iron oxide particles according to the present invention, is preferably not more than 20 minutes, more preferably not more than 15 minutes.

The respective properties of the black magnetic iron oxide particles according to the present invention can be further improved by forming any one of the following coating layers (1) to (4) on at least a part of the surface of each the black magnetic iron oxide particle.

(1) A Coating Layer Comprising an Organic Compound Having a Hydrophobic Group

The obtained black magnetic iron oxide particles have a liquid absorption of a styrene-acrylic resin solution of not more than 10 ml/10 g, and show an improved dispersibility in binder resins such as styrene-acrylic resins.

(2) A Coating Layer Comprising an Aluminum Compound

The obtained black magnetic iron oxide particles each have an aluminum compound layer on the surface thereof, and exhibit a high positive electrification property, so that it is possible to obtain a magnetic toner having a narrow distribution of charging amounts.

(3) A Coating Layer Comprising a Silicon Compound

The obtained black magnetic iron oxide particles each have a silicon compound layer on the surface thereof, and exhibit a high negative electrification property, so that it is possible to obtain a magnetic toner having a narrow distribution of charging amounts.

(4) A Coating Layer Comprising Fine Particles of Oxide of Al, Si, Zr and/or Ti

The obtained black magnetic iron oxide particles each have a fine particles layer composed of oxide of Al, Si, Zr and/or Ti on the surface thereof, and exhibit an enhanced flowability, so that it is possible to obtain a magnetic toner having an excellent durability.

The respective coating layers are explained in detail below.

(1) At least a part of the surface of the black magnetic iron oxide particle according to the present invention may be coated with the coating layer comprising an organic compound having a hydrophobic group. By forming the coating layer comprising an organic compound having a hydrophobic group on the surface of each black magnetic iron oxide particle, it is possible to enhance the dispersibility of the black magnetic iron oxide particles in resins used for a magnetic toner. When the black magnetic iron oxide particles are coated with organic compounds having functional groups other than hydrophobic groups, the magnetic particles have a poor compatibility with the resins, resulting in deteriorated dispersibility.

As the organic compounds having a hydrophobic group, there may be used coupling agents such as titanate-based coupling agents and silane-based coupling agents, or ordinary surfactants.

Examples of the titanate-based coupling agents having a hydrophobic group may include isopropyl triisostearoyl titanate, isopropyl tridecylbenzene sulfonyl titanate, isopropyl tris(dioctylpyrophosphate)titanate, bis(dioctyl pyrophosphate)oxyacetate titanate, bis(dioctylpyrophosphate)ethylene titanate or the like.

Examples of the silane-based coupling agents having a hydrophobic group may include vinyl trimethoxysilane, γ-glycidoxypropyl trimethoxysilane, γ-methacyloxypropyl methoxysilane, phenyl trimethoxysilane and decyl triethoxysilane or the like.

Examples of the ordinary surfactants may include known surfactants, e.g., anionic surfactants such as phosphate-based surfactants or nonionic surfactants such as fatty acid ester-based surfactants, natural fat and oil derivatives such as alkyl amines, or the like.

The coating amount of the organic compound having a hydrophobic group is preferably 0.5 to 5 parts by weight, more preferably 1 to 3 parts by weight based on 100 parts by weight of the black magnetic iron oxide particles to be treated. When the coating amount of the organic compound having a hydrophobic group is less than 0.5 parts by weight, it may be difficult to impart a sufficient hydrophobic property to the black magnetic iron oxide particles, so that it may fail to improve the compatibility with resins. When the coating amount of the organic compound is more than 5 parts by weight, the amount of components not contributing to magnetic properties of the black magnetic iron oxide particles may be increased, so that the obtained magnetic particles may be deteriorated in saturation magnetization and, therefore, unsuitable as magnetic particles for a magnetic toner.

The magnetic particles for magnetic toner having the coating layer comprising the organic compound having a hydrophobic group, have the substantially same particle diameter, aspect ratio, FeO content, BET specific surface area, saturation magnetization value, soluble sodium salt content and blackness as those of the black magnetic iron oxide particles to be treated.

(2) & (3) At least a part of the surface of the black magnetic iron oxide particle according to the present invention may be preferably coated with an aluminum compound and/or a silicon compound, if required. The coating of the aluminum compound and/or a silicon compound (hydroxides and/or oxides of aluminum and/or silicon) may be conducted by adding an aluminum compound, a silicon compound or both the compounds to a water suspension in which the black magnetic iron oxide particles are dispersed, followed by mixing and stirring, and further adjusting the pH value of the suspension, if required, thereby coating the surfaces of the black magnetic iron oxide particles with at least one compound selected from the group consisting of hydroxides of aluminum, oxides of aluminum, hydroxides of silicon and oxides of silicon. The thus obtained magnetic acicular particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

As the silicon compounds, there may be exemplified #3 water glass, sodium orthosilicate, sodium metasilicate or the like.

By coating the surface of each black magnetic iron oxide particle with the aluminum compound or the silicon compound, the black magnetic iron oxide particles exhibit a good compatibility with resins, resulting in improved dispersibility thereof.

The coating amount of the aluminum compound is preferably 0.01 to 0.5% by weight, more preferably 0.05 to 0.3% by weight (calculated as Al element) based on the weight of the black magnetic iron oxide particles to be treated. When the coating amount of the aluminum compound is less than 0.01% by weight, the surface-coating effect may not be sufficiently exhibited. When the coating amount of the aluminum compound is more than 0.5% by weight, the obtained black magnetic iron oxide particles coated with the aluminum compound undergo a high moisture absorption, so that the electrical properties thereof may be deteriorated.

The coating amount of the silicon compound is preferably 0.01 to 0.5% by weight, more preferably 0.05 to 0.3% (calculated as $SiO_2$) based on the weight of the black magnetic iron oxide particles. When the coating amount of the silicon compound is less than 0.01% by weight, the surface-coating effect may not be sufficiently exhibited. When the coating amount of the silicon compound is more than 0.5% by weight, the obtained black magnetic iron oxide particles coated with the silicon compound may undergo a high moisture absorption, so that the electrical properties thereof may be deteriorated.

The black magnetic iron oxide particles for magnetic toner which are coated with the aluminum compound or the silicon compound, have the substantially same particle diameter, aspect ratio, FeO content, soluble sodium salt content and blackness as those of the black magnetic iron oxide particles to be treated.

(4) In the black magnetic iron oxide particles according to the present invention, fine particles of an oxide of at least one element selected from the group consisting of Al, Si, Zr and Ti may be adhered or deposited onto at least a part of the surface thereof in an amount of preferably 0.25 to 5% by weight based on the weight of the black magnetic iron oxide particles to be treated.

More specifically, the amount of the specific fine oxide particles adhered is preferably 0.25 to 5% by weight, more preferably 0.5 to 3.0% by weight (calculated as oxide thereof) based on the weight of the black magnetic iron oxide particles to be treated. When the amount of the fine oxide particles adhered is less than 0.25% by weight, it may become difficult to improve the flowability of the black magnetic iron oxide particles, so that the flowability of a magnetic toner obtained therefrom may be deteriorated.

When the amount of the fine oxide particles adhered is more than 5% by weight, the black magnetic iron oxide particles may undergo a high water absorption under high-temperature and high-humidity conditions, so that the flowability of a magnetic toner obtained therefrom may be deteriorated. Further, since the content of the oxides of specific elements as components not contributing to magnetic properties of the black magnetic iron oxide particles is increased, the saturation magnetization values of not only the black magnetic iron oxide particles but also the magnetic toner may be deteriorated.

The black magnetic iron oxide particles according to the present invention onto which the fine oxide particles are adhered or deposited, have the substantially same particle diameter, aspect ratio, FeO content, soluble sodium salt content and blackness as those of the black magnetic iron oxide particles to be treated.

In the present invention, the surfaces of the fine oxide particles may be coated with at least one compound selected from the group consisting of methyl silane, trimethyl silane and octyl silane (hereinafter referred to merely as "hydrophobicity-imparting or hydrophobizing compound").

As the fine oxide particles whose surfaces are coated with the hydrophobizing compound (hereinafter referred to merely as "hydrophobicity-imparted or hydrophobized fine particles"), there may be used commercially available products. The amount of the hydrophobized fine particles adhered is preferably 0.25 to 5.0% by weight based on the weight of the black magnetic iron oxide particles to be treated. When the amount of the hydrophobized fine particles adhered is less than 0.25% by weight, it may be difficult to improve the flowability of the black magnetic iron oxide particles, so that the flowability of a magnetic toner obtained therefrom may be deteriorated. When the amount of the hydrophobized fine particles adhered is more than 5.0% by weight, the aimed effect of the present invention is attainable. However, in this case, the content of components not contributing to magnetic properties of the black magnetic iron oxide particles is increased, so that the saturation magnetization value thereof may be reduced. Such particles having a less saturation magnetization value may be unsuitable as magnetic particles for a magnetic toner. The amount of the hydrophobized fine particles adhered is more preferably 0.5 to 3.0% by weight based on the weight of the black magnetic iron oxide particles to be treated.

The black magnetic iron oxide particles onto which the hydrophobized fine particles are adhered or deposited, have the substantially same particle diameter, aspect ratio, FeO content and soluble sodium salt content as those of the black magnetic iron oxide particles to be treated.

Next, the process for producing the black magnetic iron oxide particles according to the present invention is described.

The black magnetic iron oxide particles having an average particle diameter of 0.1 to 0.3 µm are produced by:

(a) passing an oxygen-containing gas through an aqueous ferrous salt reaction solution containing ferrous hydroxide colloid obtained by reacting an aqueous ferrous salt solution with an aqueous alkali solution having an alkali concentration of less than one equivalent based on $Fe^{2+}$ contained in the said aqueous ferrous salt solution, while heating said aqueous ferrous salt reaction solution to a temperature of preferably 70 to 100° C., thereby producing a reaction solution having a pH of 4.0 to 5.0 and containing black spinel iron oxide particles as core particles;

(b) successively passing an oxygen-containing gas through the said reaction solution to surface-oxidize the said core particles;

(c) adding an aqueous alkali hydroxide solution to the reaction solution obtained after completion of the surface-oxidation of the said core particles, to adjust the pH of the said reaction solution to 7.0 to 8.0;

(d) passing an oxygen-containing gas through the resultant reaction solution while heating the reaction solution to a temperature of preferably 70 to 100° C., to form a surface coat comprising fine spinel iron oxide particles on the surface of each core particle; and (e) successively passing an oxygen-containing gas through the reaction solution to oxidize the said surface coat comprising the fine spinel iron oxide particles.

As the aqueous ferrous salt solution used in the present invention, there may be exemplified an aqueous ferrous sulfate solution, an aqueous ferrous chloride solution or the like.

As the aqueous alkali hydroxide solution used in the present invention, there may be exemplified an aqueous solution of alkali metal hydroxide such as sodium hydroxide and potassium hydroxide, an aqueous solution of alkali earth metal hydroxide such as magnesium hydroxide and calcium hydroxide, an aqueous solution of alkali carbonate such as sodium carbonate and potassium carbonate, ammonium carbonate, aqueous ammonia, or the like.

The amount of the aqueous alkali hydroxide solution used in the production reaction of the core particles is usually 0.90 to 0.99 equivalent based on $Fe^{2+}$ contained in the aqueous ferrous salt solution. When the amount of the aqueous alkali hydroxide solution used is less than 0.90 equivalent, the thickness of the subsequently-produced surface coat comprising fine spinel iron oxide particles may become large, thereby failing to obtain black magnetic iron oxide particles having a sufficient blackness. When the amount of the aqueous alkali hydroxide solution used is more than 0.99 equivalent, the thickness of the surface coat may become small, thereby failing to obtain black magnetic iron oxide particles having excellent electrical properties. The amount of the aqueous alkali hydroxide solution used is in the range of preferably 0.90 to 0.97 equivalent based on Fe contained in the aqueous ferrous salt solution.

The production reaction of the core particles is conducted at a temperature of usually 70 to 100° C. When the reaction temperature is less than 70° C., acicular goethite particles may be disadvantageously mixed in the obtained core particles. When the reaction temperature is more than 100° C., it is possible to produce black spinel iron oxide particles. However, the production reaction under such a high temperature condition is disadvantageous from industrial viewpoint because the use of special apparatuses such as autoclave is required therefor.

As the oxidation method for the production of the core particles, there may be used a method of passing an oxygen-containing gas (e.g., air) through the solution.

Incidentally, the pH value of the reaction solution after completion of the production reaction of the core particles is usually 4.0 to 5.0. The surface-oxidation of the core particles is conducted at a temperature of usually 70 to 100° C.

After completion of the surface oxidation of the core particles, the pH value of the reaction solution containing the surface-oxidized core particles is adjusted to usually 7.0 to 8.0, preferably 7.5 to 8.0 by adding an aqueous alkali hydroxide solution thereto. When the pH value of the reaction solution is less than 7.0, unreacted $Fe^{2+}$ may still remain in the reaction solution which is industrially disadvantageous. When the pH value of the reaction solution is more than 8.0, a layer composed of highly-crystalline black spinel iron oxide particles may be formed on the surface of each core particle. As a result, it may become difficult to conduct the subsequent surface-oxidation of the obtained particles.

After completing the reaction for producing a surface coat composed of fine spinel iron oxide particles on the surface of each core particle, the surface coat composed of fine spinel iron oxide particles is subjected to oxidation reaction while maintaining the pH value of the obtained reaction solution in the above specified range.

Meanwhile, in the production of the core particles, a metal salt containing at least one metal element selected from the group consisting of Mn, Zn, Ni, Cu and Ti may be added to the reaction solution, if necessary, in order to incorporate these metal elements to the core particles.

As the metal salts, there may be exemplified metal sulfates, metal nitrates, metal chlorides or the like.

The total amount of metal elements in the metal salt added is usually not more than 10 atm % (atomic percent), preferably 0 to 8 atm %, more preferably 0.01 to 8 atm % based on the iron atoms.

(1) The black magnetic iron oxide particles having coating layer comprising an organic compound having a hydrophobic group, are obtained by kneading black magnetic iron oxide particles to be treated with the organic compound having a hydrophobic group using a wheel-type kneader or an attrition mill so as to subject the mixture to compression, shearing and spatula-stroking, thereby coating the surface of each black magnetic iron oxide particle with the organic compound having a hydrophobic group.

As the wheel-type kneader used for the above purpose, there may be used Simpson mix muller, multimill, Stotz mill, back-flow kneader, Irich mill or the like. However, wet pan mill, melanger, whirl mixer and quick mill are inapplicable since these apparatuses perform no shearing work, but only compression and spatula-stroking.

The linear load used upon the kneading can be appropriately selected depending upon amount of the black magnetic iron oxide particles and kind and amount of the organic compound having a hydrophobic group. When 10 kg of the black magnetic iron oxide particles are coated with the organic compound having a hydrophobic group, the linear load is preferably 30 to 80 kg/cm, and the kneading time is preferably 30 to 90 minutes.

(2) & (3) The black magnetic iron oxide particles having the coating layer comprising the aluminum compound or the silicon compound is obtained by the following manner.

The aluminum compound or the silicon compound is added to the suspension containing the black magnetic iron oxide particles to be treated, and then an aqueous alkali solution or an aqueous acid solution is added thereto to precipitate the aluminum and/or silicon compound on the surface of each black magnetic iron oxide particle.

The thus obtained black magnetic iron oxide particles onto which the aluminum and/or silicon compound is coated, are subjected to compression, shearing and spatula-stroking using a wheel-type kneader or an attrition mill, thereby coating the surface of each black magnetic iron oxide particle with the aluminum compound and/or the silicon compound.

As the wheel-type kneaders, there may be used Simpson mix muller, multimill, Stotz mill, back-flow kneader, Irich mill or the like. However, wet pan mill, melanger, whirl mixer and quick mill are inapplicable to the kneading since these apparatuses perform no shearing work, but only compression and spatula-stroking.

The linear load used upon the treatment can be appropriately selected depending upon amount of the black magnetic iron oxide particles and kind and amount of the aluminum compound or silicon compound. When 10 kg of the black magnetic iron oxide particles are coated with the aluminum compound or silicon compound, the linear load is preferably 30 to 80 kg/cm, and the treating time is preferably 30 to 90 minutes.

(4) The black magnetic iron oxide particles having the coating layer comprising fine particles of oxide of Al, Si, Zr and/or Ti are obtained by adding fine particles of an oxide of at least one element selected from the group consisting of Al, Si, Zr and Ti in an amount of 0.25 to 5 parts by weight to 100 parts by weight of the black magnetic iron oxide particles to be treated, and then mixing these particles together using a wheel-type kneader or an attrition mill.

As the wheel-type kneader used for the above purpose, there may be used Simpson mix muller, multimill, Stotz mill, back-flow kneader, Irich mill or the like. However, wet pan mill, melanger, whirl mixer and quick mill are inapplicable since these apparatuses perform no shearing work, but only compression and spatula-stroking.

The linear load used upon the mixing can be appropriately selected depending upon amount of the black magnetic iron oxide particles and kind and amount of the fine particles of an oxide of at least one element selected from the group consisting of Al, Si, Zr and Ti. When 10 kg of the black magnetic iron oxide particles are coated with the fine particles of an oxide of at least one element selected from the group consisting of Al, Si, Zr and Ti, the linear load is preferably 30 to 80 kg/cm, and the mixing time is preferably 30 to 90 minutes.

The hydrophobized (hydrophobicity-imparted) fine particles can also be adhered or deposited onto the surface of each black magnetic iron oxide particle in the same manner as described above. As the hydrophobized fine particles, there may be used commercially available products.

Next, the magnetic toner according to the present invention is described.

The magnetic toner according to the present invention comprises the black magnetic iron oxide particles, and a binder resin. The magnetic toner may further contain a mold release agent, a colorant, a charge-controlling agent and other additives, if necessary.

The magnetic toner according to the present invention has an average particle size of usually 3 to 15 $\mu$m, preferably 5 to 12 $\mu$m.

The amount of the binder resin used in the magnetic toner is usually 50 to 900 parts by weight, preferably 50 to 400 parts by weight based on 100 parts by weight of the black magnetic iron oxide particles.

As the binder resins, there may be used vinyl-based polymers, i.e., homopolymers or copolymers of vinyl-based monomers such as styrene, alkyl acrylates and alkyl methacrylates. As the styrene monomers, there may be exemplified styrene and substituted styrenes. As the alkyl acrylate monomers, there may be exemplified acrylic acid, methyl acrylate, ethyl acrylate, butyl acrylate or the like.

It is preferred that the above copolymers contain styrene-based components in an amount of usually 50 to 95% by weight.

In the binder resin used in the present invention, the above-mentioned vinyl-based polymers may be used in combination with polyester-based resins, epoxy-based resins, polyurethane-based resins or the like, if necessary.

The magnetic toner according to the present invention may be produced by a known method of mixing and kneading a predetermined amount of a binder resin and a predetermined amount of the black magnetic iron oxide particles together, and then pulverizing the mixed and kneaded material into particles. More specifically, the black magnetic iron oxide particles and the binder resin are intimately mixed together with, if necessary, a mold release agent, a colorant, a charge-controlling agent or other additives by using a mixer. The obtained mixture is then melted and kneaded by a heating kneader so as to render the respective components compatible with each other, thereby dispersing the black magnetic iron oxide particles therein. Successively, the molten mixture is cooled and solidified to obtain a resin mixture. The obtained resin mixture is then pulverized and classified, thereby producing a magnetic toner having an aimed particle size.

As the mixers, there may be used a Henschel mixer, a ball mill or the like. As the heating kneaders, there may be used a roll mill, a kneader, a twin-screw extruder or the like. The pulverization of the resin mixture may be conducted by using pulverizers such as a cutter mill, a jet mill or the like. The classification of the pulverized particles may be conducted by known methods such as air classification, etc., as described in Japanese Patent No. 2683142 or the like.

As the other method of producing the magnetic toner, there may be exemplified a suspension polymerization method or an emulsion polymerization method. In the suspension polymerization method, polymerizable monomers and the black magnetic iron oxide particles are intimately mixed together with, if necessary, a colorant, a polymerization initiator, a cross-linking agent, a charge-controlling agent or the other additives and then the obtained mixture is dissolved and dispersed together so as to obtain a monomer composition. The obtained monomer composition is added to a water phase containing a suspension stabilizer while stirring, thereby granulating and polymerizing the composition to form magnetic toner particles having an aimed particle size.

In the emulsion polymerization method, the monomers and the black magnetic iron oxide particles are dispersed in water together with, if necessary, a colorant, a polymerization initiator or the like and then the obtained dispersion is polymerized while adding an emulsifier thereto, thereby producing magnetic toner particles having an aimed particle size.

The important point of the present invention lies in such a fact that by specifying the thickness of the surface layer of each black magnetic iron oxide particle and by adjusting the FeO content of the surface layer to usually 8 to 14% by weight based on the weight of Fe contained in the surface layer, the obtained black magnetic iron oxide particles exhibit a sufficient blackness as well as excellent dispersibility and electrical properties.

The reason why the black magnetic iron oxide particles of the present invention exhibit a sufficient blackness is considered as follows. That is, the FeO content of only the surface layer of each black magnetic iron oxide particle is reduced, but since the black magnetic iron oxide particles according to the present invention still contain a sufficient amount of FeO as a whole because of the high FeO content of the central portion thereof, the black magnetic iron oxide particles can show a sufficient blackness.

The reason why the black magnetic iron oxide particles of the present invention have an excellent dispersibility is considered as follows. That is, since the FeO content of the surface layer is reduced and the magnetization of the surface layer, thereby reducing the magnetic interaction therebetween, the black magnetic iron oxide particles according to the present invention are prevented from being magnetically aggregated together, and the individual particles are present separately from each other. Further, the reason why the black magnetic iron oxide particles coated with the aluminum compound exhibit a more excellent dispersibility is considered such that the coated particles are not only prevented from being magnetically aggregated together, but also show a good compatibility with resins.

Further, the reason why the black magnetic iron oxide particles of the present invention exhibit excellent electrical properties is considered as follows. That is, since the FeO content of the surface layer having a specific thickness is adjusted to 8 to 14% by weight based on the weight of Fe contained in the surface layer, the electric resistance value of the surface layer of the black magnetic iron oxide particles is increased, so that it is difficult to leak the charge of the black magnetic iron oxide particles. As a result, the charge saturation time of the black magnetic iron oxide particles become to shorten.

Another important point of the present invention lies in that when the black magnetic iron oxide particles are coated with the organic compound having a hydrophobic group, the obtained coated black magnetic iron oxide particles exhibit a sufficient blackness, and are excellent in electrical properties and dispersibility in resins.

The reason why the black magnetic iron oxide particles coated with the organic compound having a hydrophobic group exhibit an excellent dispersibility in resins is considered as follows. That is, due to the reduced FeO content of the surface layer, as seen from the above, the black magnetic iron oxide particles are prevented from being magnetically aggregated together, thereby allowing the individual particles to be present separately from each other. Further, since the surfaces of the black magnetic iron oxide particles are coated with the organic compound having a hydrophobic group using a wheel- type kneader or an attrition mill subjecting to compression, shearing and spatula-stroking, the obtained particles are mutually deaggregated and free from re-aggregation thereof, so that the individual particles are allowed to be present separately from each other. Furthermore, the coated particles have the highly hydrophobized surfaces.

A further point of the present invention lies in that by adhering or depositing fine particles of an oxide of at least one element selected from the group consisting of Al, Si, Zr and Ti, there can be obtained magnetic particles for magnetic toner capable of showing excellent flowability and electrification property and maintaining these property stably for a long period of time.

The reason why the black magnetic iron oxide particles coated with the specific fine metal oxide particles exhibit an excellent electrification property is considered such that the obtained coated particles have not only a sufficient blackness but also excellent electrical properties.

Also, the black magnetic iron oxide particles according to the present invention are prevented from being magnetically aggregated together due to the reduced FeO content of the surface layer thereof, and are excellent in dispersibility since the individual particles are present separately from each other.

The reason why the black magnetic iron oxide particles according to the present invention can have an excellent flowability and maintain flowability and electrification property stably, is considered as follows. That is, a good synergistic effect can be obtained by the combination of causing the individual magnetic particles to be present separately from each other due to the excellent dispersibility thereof; keeping the particles in deaggregated state so as to be present separately from each other and preventing the obtained particles from being re-aggregated together by coating the surfaces of the black magnetic iron oxide particles with the fine metal oxide particles using a wheel-type kneader or an attrition mill subjecting to compression, shearing and spatula-stroking; and uniformly and densely adhering or depositing fine particles of the specific metal oxide particles onto the surfaces of the black magnetic iron oxide particles.

The reason why the magnetic toner using the magnetic particles coated with the hydrophobized fine particles exhibit a more excellent flowability is considered as follows. That is, a certain synergistic effect will be obtained by the adhesion or deposition of the fine particles on the surfaces of the black magnetic iron oxide particles, and the hydrophobizing material applied to the surfaces thereof.

The magnetic toner obtained by using the black magnetic iron oxide particles according to the present invention can exhibit a high initial image density under high-temperature and high-humidity conditions due to excellent dispersibility and short charge saturation time of the black magnetic particles contained therein.

The magnetic toner obtained by using the black magnetic iron oxide particles whose surfaces have the organic compound having a hydrophobic group, can be prevented from being reduced in image density even after allowed to stand under high-temperature and high-humidity conditions and can exhibit a good environmental stability, due to excellent dispersibility and short charge saturation time of the magnetic particles contained therein.

The magnetic toner obtained by using the black magnetic iron oxide particles whose surfaces have the silicon compound and/or the aluminum compound, can exhibit a less fogging due to a large charge amount of the magnetic particles contained therein and, therefore, a narrow charge amount distribution of the magnetic toner.

The magnetic toner obtained by using the black magnetic iron oxide particles onto which the oxide of the specified element is surface-adhered, can exhibit a high image density, since the magnetic toner is effectively prevented from being deteriorated in flowability even under high-temperature and high-humidity conditions due to increased flowability of the magnetic particles contained therein and, therefore, increased flowability of the magnetic toner itself.

Thus, the black magnetic iron oxide particles according to the present invention are suitable as those for magnetic toner due to sufficient blackness as well as excellent dispersibility and electrical properties thereof.

When the black magnetic iron oxide particles of the present invention having excellent dispersibility and electrical properties are used for the production of magnetic toner, there can be obtained a magnetic toner exhibiting an excellent electrification property.

Further, the magnetic toner obtained by using the black magnetic iron oxide particles of the present invention which are excellent in dispersibility and electrical properties, is capable of not only exhibiting excellent electrification property and flowability, but also maintaining the excellent electrification property and flowability stably for a long period of time.

EXAMPLES

The present invention is described in more detail by Examples and Comparative Examples, but the Examples are only illustrative and, therefore, not intended to limit the scope of the present invention.

Various properties were evaluated by the following methods.

(1) The shape of the black magnetic iron oxide particles or the magnetic particles was observed using a transmission electron microscope and a scanning electron microscope.

(2) The average particle diameter of the black magnetic iron oxide particles or the magnetic particles is expressed by the average value of Marcin diameters of 300 particles appearing on the photo obtained by magnifying the transmission electron micrograph (magnification: ×10,000) four times.

(3) The aspect ratio of the black magnetic iron oxide particles or the magnetic particles is expressed by the ratio of major axial diameter to minor axial diameter of the 300 particles on the magnified micrograph.

(4) The thickness of the surface layer of each black magnetic iron oxide particle from a surface thereof and the FeO contents are measured according to the following chemical analysis method.

<The thickness (depth) of the Surface Layer of Each Sample Was Determined as Follows>

1.2 liters of ion-exchange water was charged into a 2-liter beaker and heated therein until the water temperature reached 45° C. Separately, 10 g of black magnetic iron oxide particles were dispersed in 160 milliliters of ion-exchange water to obtain a slurry. While washing the slurry with 320 milliliters of ion-exchange water, the slurry was charged together with the ion-exchange water into the 2-liter beaker.

Then, the slurry in the 2-liter beaker was mixed with guaranteed hydrochloric acid while maintaining the temperature of the slurry at 40 and stirring the slurry at 200 rpm, thereby initiating the dissolution of the particles. At this time, the concentration of the black magnetic iron oxide particles in the slurry was 5 g/liter, and the concentration of the aqueous hydrochloric acid solution was about 1N.

20 milliliters of the resultant solution was sampled every 5 minutes from the initiation of dissolution of the particles until the solution became transparent, and then filtered through a 0.1-$\mu$m membrane filter to obtain a filtrate as a sample.

10 milliliters of the thus sampled filtrate was analyzed using an inductively coupled plasma atomic emission spectrometer SPS-4000 (manufactured by Seiko Denshi Kogyo, Co., Ltd.) to determine the quantity of iron.

The dissolution percentage of iron in the black magnetic iron oxide particles was calculated according to the following formula:

Dissolution percentage (%) of iron=(concentration of iron element in sample (mg/liter))/(concentration of iron element completely dissolved (mg/liter))×100

The percentage of thickness (depth) of the surface layer to radius of each black magnetic iron oxide particle was calculated from the dissolution percentage of iron element obtained above.

<The FeO Content in Each Sample Was Determined as Follows.>

10 milliliters of the remaining filtrate was mixed with about 50 milliliters of ion-exchange water to prepare a test sample. Two or three droplets of diphenylamine sulfonic acid as indicator were added into the test sample, and the test sample was then subjected to oxidation-reduction titration using a 0.1N aqueous potassium bichromate solution. At the time at which the test sample was colored bluish violet, the titration was terminated to determine the titre. The percentage (wt. %) of FeO based on the weight of iron element was calculated according to the following formula:

FeO (wt. %)={(atomic weight of FeO: 71.85)×0.1×titring amount (ml))/(weight (mg) of iron element in test sample)×100

The FeO content in the surface layer of the black magnetic iron oxide particles was defined as the percentage (wt. %) of FeO contained in such a surface layer having a thickness which extends radially inwardly from the surface of each black magnetic iron oxide particle and which is from the surface thereof to about 3.5% per a radius of each black magnetic iron oxide particle, based on the weight of Fe contained in the surface layer.

Meanwhile, the FeO content in the whole black magnetic iron oxide particles was measured by the following chemical analysis method.

That is, about 0.5 g of the black magnetic iron oxide particles were precisely weighed in an inert gas atmosphere, and dissolved in 25 ml of a mixed solution containing phosphoric acid and sulfuric acid at a weight ratio of 2:1. The obtained solution in which the black magnetic iron oxide particles were dissolved, was diluted, and several droplets of diphenylamine sulfonic acid as indicator were added into the diluted solution. Thereafter, the solution was subjected to oxidation-reduction titration using an aqueous potassium bichromate solution. At the time at which the diluted solution exhibited violet color, the titration was terminated to determine the amount of the aqueous potassium bichromate solution used during the titration. The FeO content was calculated from the measured value.

(5) The BET specific surface area value of the black magnetic iron oxide particles or the magnetic particles was measured by a BET method using "Mono Sorb MS-II" (manufactured by Yuasa Ionics Co., Ltd.).

(6) The magnetic properties of the black magnetic iron oxide particles or the magnetic particles were measured under an external magnetic field of not more than 796 kA/m by using a vibration sample magnetometer "VSM-3S-15" (manufactured by Toei Kogyo Co., Ltd.).

(7) The soluble sodium salt content of the black magnetic iron oxide particles is expressed by the value measured using an inductively coupled plasma atomic emission spectrometer SPS-4000 (manufactured by Seiko Denshi Kogyo, Co., Ltd.).

(8) The blackness (a* value) of the magnetic particles is expressed by the value obtained by measuring L*, a* and b* values of each sample in the "Lab" space of Hunter using a "Multi-Light-Source Spectrocolorimeter MSC-IS-2D" (manufactured by Suga Testing Machines Manufacturing Co., Ltd.) according to (L*, a* and b*) uniform sensory color space of Commission Internationale de l'Eclairage CIE (1976). The closer to zero the a* value, the more excellent the blackness of the magnetic particles.

(9) The dispersibility of the black magnetic iron oxide particles was determined as follows. That is, 10 g of the black magnetic iron oxide particles were tested three times according to the method of measuring the amount of residues on sieve as prescribed in "Pigment Test Method" of JIS K-5101-1991, and the dispersibility was expressed by an average value of the three measured values.

(10) The time required until the charging amount of the black magnetic iron oxide particles was saturated, was measured by the following method.

That is, 0.5 g of the sample particles and 4.75 g of iron powder carrier (tradename: TEFV-200/300, produced by Powdertec Co., Ltd.) were precisely weighed and charged into a sampling glass bottle having an inner volume of 15 cc, and frictionally electrified using a paint conditioner. The charge amount of the particles by the frictional electrification was measured using "Blow-Off Charge Amount Measuring Device" (manufactured by Toshiba Chemical Co., Ltd.). The charge amount of the particles relative to the time required for the frictional electrification using the paint conditioner, were plotted on a graph to determine a charge saturation time at which the charge amount was stabilized.

The shorter the charge saturation time, the more excellent the magnetic properties of the magnetic particles and, therefore, the higher the charging capacity of the magnetic toner.

(11) The amount of an aluminum compound and silicon compound coated on the surfaces of the black magnetic iron oxide particles was measured by a "Fluorescent X-ray Analyzer 3063 M type" (manufactured by Rigaku Denki Kogyo Co., Ltd.), and expressed by the amount (calculated as Al and $SiO_2$) based on the weight of the black magnetic iron oxide particles.

(12) The amount of fine particles of oxide of at least one element selected from the group consisting of Al, Si, Zr and Ti which were adhered or deposited on the surface of each black magnetic iron oxide particle, was measured by a "Fluorescent X-ray Analyzer 3063 M type" (manufactured by Rigaku Denki Kogyo Co., Ltd.), and expressed by the amount (calculated as an oxide of each element) based on the weight of the black magnetic iron oxide particles.

(13) The liquid absorption of the black magnetic iron oxide particles according to the present invention as one of indices of dispersibility thereof was measured by the following method.

That is, the liquid absorption is expressed as the amount of a styrene-acrylic resin solution absorbed into 10 g of the magnetic particles.

(i) A styrene-acrylic resin (tradename: "HIGHMER-TB-1000", produced by Sanyo Kasei Co., Ltd.) and xylene were precisely weighed and charged into a 500-ml polyester container with a top lid such that the resin content was 20% by weight. The mixture was blended together by a paint conditioner to prepare a resin solution.

(ii) 10 g of the black magnetic iron oxide particles were weighed by an electronic balance and charged into a 100-ml polyester container. Then, the previously prepared resin solution was dropped into the 100-ml container through a burette while stirring the resultant mixture by a glass rod.

(iii) The dropping of the resin solution was terminated when the mixture (paste) in the polyester container became homogeneous and exhibited a high flowability, and was first dropped by gravity from the tip end of the glass rod.

(iv) The amount of the resin solution used until reaching the terminal point was determined as the liquid absorption of the black magnetic iron oxide particles.

The lower the liquid absorption of the black magnetic iron oxide particles, the higher the dispersibility of the black magnetic iron oxide particles in resins and, therefore, the higher the charging capacity of the magnetic toner.

(14) The gloss of the resin sheet as one of indices of dispersibility of the black magnetic iron oxide particles according to the present invention was measured by the following method.

That is, 15 g of the black magnetic iron oxide particles, 34 g of a styrene-acrylic resin which was previously dried at 60° C. for 8 hours (tradename: "HIGHMER TB-9000", produced by Sanyo Kasei Co., Ltd.) and 1 g of a polypropylene resin as a mold release agent (tradename: "BISCOL 550P", produced by Sanyo Kasei Co., Ltd.) were kneaded together using a twin hot roll having a surface temperature of 130° C., thereby obtaining a kneaded material. The obtained kneaded material was then molded into a sheet using a hot press, thereby producing a sheet-like resin kneaded material. The gloss of a resin film surface of the sheet-like kneaded material was measured at incident and reflection angles of 200 using a digital gloss meter ("UGV-50", manufactured by Suga Testing Machines Manufacturing Co., Ltd.). The larger the gloss value, the higher the dispersibility of the black magnetic iron oxide particles in resins.

(15) The dispersibility of the black magnetic iron oxide particles in magnetic toner was measured as follows. That is, the black magnetic iron oxide particles were mixed with other components shown below at a mixing ratio also shown below using a Henschel mixer, and the resultant mixture was melt-kneaded using a twin-screw extrusion kneader (tradename: "S-1", manufactured by Kurimoto Tekko Co., Ltd.). The obtained kneaded material was cooled and then finely divided into particles. Further, the obtained particles were classified, thereby producing a magnetic product having a volume-average particle size of 8 to 10 μm (measured by "Multisizer II" (tradename) manufactured by Colter Counter Corp.). 0.5 part by weight of hydrophobic silica powder (tradename: "RX-200", produced by Nippon Aerogel Co., Ltd.) was externally added to 100 parts by weight of the obtained magnetic product, thereby obtaining a magnetic toner as a final product.

Styrene-acrylic copolymer resin: 100 parts by weight
Magnetic iron oxide particles 60 parts by weight
Negative charge-controlling agent: 0.5 part by weight
Low-molecular weight wax 5 parts by weight The obtained magnetic toner was sliced by an ultramicrotome (tradename: "MT2C", manufactured by Research Manufacturing Co., Ltd.), and the section of the sliced magnetic toner was observed by a transmission electron microscope (magnification: ×10,000) to examine the aggregated state of the magnetic particles within visual field. The results were classified into the following four ranks. The fewer the aggregated particles, the higher the dispersibility of the magnetic particles.

| Rank of dispersibility | Number of aggregated particles |
| --- | --- |
| A | 0 to 1 |
| B | 2 to 5 |
| C | 6 to 10 |
| D | not less than 11 |

(16) The flowability index of the black magnetic iron oxide particles or the magnetic toner was measured by a "Powder Tester PT-E type" (manufactured by Hosokawa Micron Co., Ltd.). The higher the flowability index, the more excellent the flowability of the black magnetic iron oxide particles or the magnetic toner.

(17) The image density of the magnetic toner using the black magnetic iron oxide particles according to the present invention was determined by printing solid black on a paper (A4) using a laser beam printer (tradename: "LASER SHOT LBP-B406E", manufactured by Canon Co., Ltd.) and measuring a density of the solid black printed by an image density-measuring device (tradename: "RD914", manufactured by MACBETH Co., Ltd.).

Example 1

Production of Black Magnetic Iron Oxide Particles 31.942 kg of a ferrous sulfate solution ($Fe^{2+}$ concentration: 1.723 mol/liter; specific gravity: 1.248 g/cc), 4.806 liters of a 18.5N aqueous NaOH solution (equivalent ratio: 0.95) were added to 17.396 liters of water, thereby obtaining an aqueous ferrous salt reaction solution containing ferrous hydroxide colloid, and air was blown into the obtained aqueous ferrous salt reaction solution at a temperature of 90° C., thereby producing black spinel iron oxide particles as core particles. The pH value of the reaction solution was maintained at 6.7 during the production of the core particles.

Upon completion of the reaction for production of the core particles (when no remaining NaOH was present), the pH value of the reaction solution was lowered to 4.2.

While maintaining the pH value of the reaction solution at 4.2, the reaction solution was air-oxidized for 30 minutes to surface-oxidize the core particles.

Then, the above NaOH solution was added to the obtained reaction solution so as to adjust the pH value thereof to 7.8, and the remaining ferrous sulfate was reacted to produce a surface coat composed of fine spinel iron oxide particles on the core particles.

After completion of the production reaction for forming the surface coat composed of fine spinel iron oxide particles on the core particles, the surface coat formed on each core particle was successively oxidized for one hour while maintaining the pH value of the reaction solution at 7.7.

After completion of oxidation of the surface coat, the obtained reaction solution was concentrated and then washed with water, thereby obtaining about 2.5 kg of black magnetic iron oxide particles.

10 kg of the black magnetic iron oxide particles obtained were charged into a Simpson mix muller "Sand Mill MPUV-2" (manufactured by Matsumoto Chuzo Tekkosho Co., Ltd.) and subjected to compression, shearing and spatula-stroking at a linear load of 30 kg/cm for 30 minutes, thereby obtaining black magnetic iron oxide particle having the surface coat composed of fine spinel iron oxide particles.

The thus obtained black magnetic iron oxide particles had an average particle diameter of 0.20 $\mu$m; an FeO content in the surface layer of 10.7% by weight; an FeO content in a central portion excluding the surface layer, of 31.0% by weight; a blackness ($a^*$ value) of +0.5; a BET specific surface area value of 8.0 $m^2$/g; a saturation magnetization value of 83.5 $Am^2$/Kg; and a charge saturation time of 5 minutes.

Figure 1:
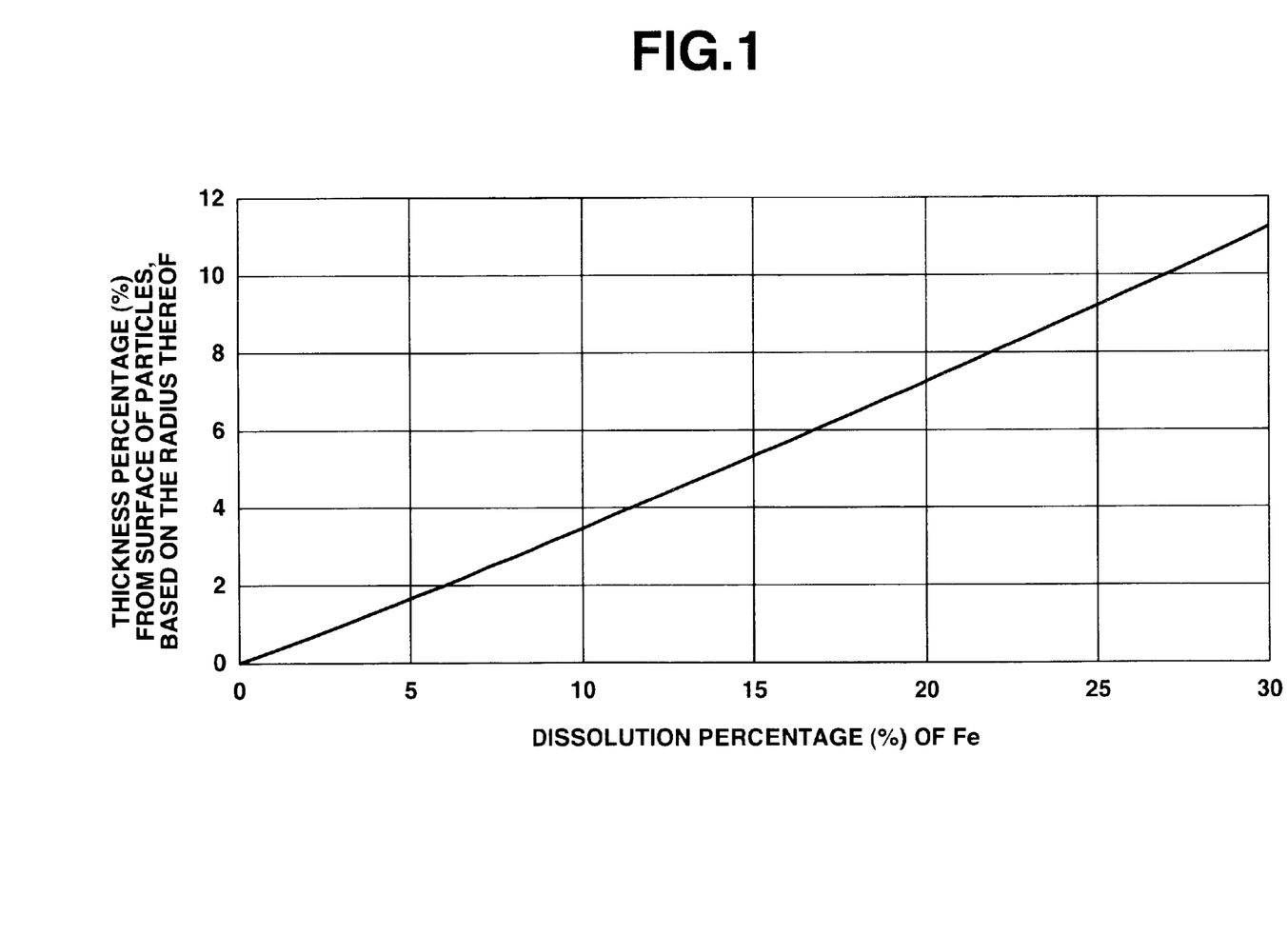
FIG. 1 is a graph showing a relationship between a dissolution percentage of Fe and a thickness percentage from a surface of each of black magnetic iron oxide particles based on a radius of the black magnetic iron oxide particles obtained in Example 1.

Meanwhile, the relationship between the dissolution percentage of the obtained black magnetic iron oxide particles and the thickness of the surface layer measured from an outer surface of each particle is shown in FIG. 1.

Use Example 1

The black magnetic iron oxide particles obtained in Example 1 were mixed with other components shown below at a mixing ratio also shown below using a Henschel mixer, and the resultant mixture was melt-kneaded using a twin-screw extrusion kneader (tradename: "S-1", manufactured by Kurimoto Tekko Co., Ltd.). The obtained kneaded material was cooled and then finely divided into particles. Further, the obtained particles were classified, thereby producing a magnetic product having a volume-average particle size of 8 to 10 $\mu$m (measured by "Multisizer II" (tradename) manufactured by Colter Counter Corp.). 0.5 part by weight of hydrophobic silica powder (tradename: "RX-200", produced by Nippon Aerogel Co., Ltd.) was externally added to 100 parts by weight of the obtained magnetic product, thereby obtaining a magnetic toner as a final product.

Styrene-acrylic copolymer resin: 100 parts by weight
Magnetic iron oxide particles 60 parts by weight
Negative charge-controlling agent: 0.5 part by weight
Low-molecular weight wax 5 parts by weight The dispersibility of the black magnetic iron oxide particles in the magnetic toner was Rank A, and the initial image density of the magnetic toner was 1.55.

Examples 2 to 10 and Comparative Examples 1 to 5

The same procedure as defined in Example 1 was conducted except that kind of aqueous alkali solution used for the production of core particles, alkali equivalent ratio, pH value, reaction temperature, reaction time required for the surface oxidation of core particles, kind of aqueous alkali solution used for production of surface coat composed of fine spinel iron oxide particles, pH values of respective reaction solutions and reaction time required for oxidation of the surface coat, were changed variously, thereby producing black magnetic iron oxide particles.

The main production conditions are shown in Table 1, and various properties of the obtained black magnetic iron oxide particles are shown in Table 2.

Example 11

The same procedure as defined in Example 1 was conducted except that the time required for water-washing the black magnetic iron oxide particles after completion of oxidation treatment of the surface coat, was shortened, thereby producing black magnetic iron oxide particles.

The main production conditions are shown in Table 1, and various properties of the obtained black magnetic iron oxide particles are shown in Table 2.

Examples 12 and 13

Surface-coating with Aluminum Compound

The reaction solution having a pH value of 7.8 which were obtained in Example 1 after completion of oxidation reaction of the surface coat composed of fine spinel iron oxide particles, was mixed with an aqueous aluminum sulfate solution, and stirred for about 10 minutes. Thereafter, an aqueous sodium hydroxide solution was added to the obtained reaction solution to adjust the pH value thereof to 7.0. The resultant reaction solution was allowed to stand for 30 minutes and then washed with water, thereby obtaining black magnetic iron oxide particles surface-coated with the aluminum compound.

The main production conditions are shown in Table 1, and various properties of the obtained black magnetic iron oxide particles are shown in Table 2.

Comparative Example 6

Surface-oxidation by Dry Method

The black magnetic iron oxide particles obtained in Comparative Example 1 were oxidized in air at 110° C. for one hour.

The main production conditions are shown in Table 1, and various properties of the obtained black magnetic iron oxide particles are shown in Table 2.

Use Examples 2 to 13 and Comparative Use Examples 1 to 6

The same procedure as defined in Use Example 1 was conducted except that kind of black magnetic iron oxide particles were varied, thereby producing a magnetic toner.

Various properties of the obtained magnetic toners are shown in Table 6.

Example 14

10 kg of the black magnetic iron oxide particles obtained in Example 1 and 200 g (2 parts by weight based on 100 parts by weight of the black magnetic iron oxide particles) of γ-glycidoxypropyl trimethoxysilane (tradename: "A-187", produced by Nippon Unicar Co., Ltd.) were charged into a Simpson mix muller "Sand Mill MPUV-2" (manufactured by Matsumoto Chuzo Tekkosho Co., Ltd.) and kneaded together at a linear load of 50 kg/cm for 60 minutes, thereby coating the surface of each black magnetic iron oxide particle with the organic compound having a hydrophobic group.

The thus obtained black magnetic iron oxide particles had an average particle diameter of 0.20 μm; a coercive force value of 5.17 kA/m; a saturation magnetization value of 81.9 $Am^2/kg$; a BET specific surface area value of 7.5 $m^2/g$; and a blackness (a* value) of +0.4. Further, as to the dispersibility (compatibility) of the obtained black magnetic iron oxide particles, the liquid adsorption thereof was 6.5 ml/100 g, and the 200 gloss of resin film molded from a kneaded material composed of the magnetic particles and a styrene-acrylic resin was 92.5%. The charge saturation time of the obtained black magnetic iron oxide particles was 2 minutes.

Use Example 14

The same procedure as defined in Use Example 1 was conducted except that the black magnetic iron oxide particles obtained in Example 14 was used, thereby producing a magnetic toner.

It was confirmed that the dispersibility of the magnetic particles in magnetic toner was Rank A, and the obtained magnetic toner had an initial image density of 1.55. Further, the image density of the magnetic toner after being allowed to stand under high-temperature (32° C.) and high-humidity (90%) conditions for 12 hours was 1.45.

Examples 15 to 16

The same procedure as defined in Example 14 was conducted except that kind and amount of organic compound having a hydrophobic group, the linear load and time were varied, thereby producing black magnetic iron oxide particles having the coating composed of the organic compound having a hydrophobic group.

Various properties of the obtained magnetic toners are shown in Table 3.

Use Examples 15 to 16

The same procedure as defined in Use Example 1 was conducted except that the black magnetic iron oxide particles obtained in Examples 15 to 16 was used, thereby producing a magnetic toner.

Various properties of the obtained magnetic toners are shown in Table 7.

Example 17

The reaction solution having a pH value of 7.8 which was obtained in Example 1 after oxidation of the surface coat composed of fine spinel iron oxide particles, was mixed with 20.2 g of an aqueous sodium silicate solution (water glass #3), and stirred for about 10 minutes. Thereafter, sulfuric acid was added to the reaction solution to adjust the pH value thereof to 7.0. The resultant reaction solution was allowed to stand for 30 minutes and then washed with water, thereby obtaining about 2.5 kg of black magnetic iron oxide particles surface-coated with the silicon compound.

10 kg of the thus obtained black magnetic iron oxide particles surface-coated with the silicon compound were charged into a Simpson mix muller "Sand Mill MPUV-2" (manufactured by Matsumoto Chuzo Tekkosho Co., Ltd.) and subjected to compression, shearing and spatula-stroking at a linear load of 50 kg/cm for 60 minutes, thereby more uniformly coating the surface of each black magnetic iron oxide particle with the silicon compound.

The thus obtained magnetic particles surface-coated with the silicon compound had an average particle diameter of 0.20 μm; a coercive force value of 5.09 kA/m; a saturation magnetization value of 83.1 $Am^2/kg$; a BET specific surface area value of 8.3 $m^2/g$; a $SiO_2$ content of 0.22% by weight; a blackness (a* value) of +0.2; a charging amount of −20 μC/g; and a charge saturation time of 5 minutes.

Use Example 17

The same procedure as defined in Use Example 1 was conducted except that the magnetic particles obtained in Example 17 was used, thereby producing a magnetic toner.

The distribution of charging amount of the obtained magnetic toner was evaluated by the four-rank method (A, B, C and D), and determined to be Rank A, and the toner fogging was also evaluated by the four-rank method (A, B, C and D), and determined to be Rank A.

Example 18

The same procedure as defined in Example 17 was conducted except that amount of the aluminum compound, the linear load and time were varied, thereby producing black magnetic iron oxide particles having the coating layer composed of the aluminum compound.

Various properties of the obtained magnetic toners are shown in Table 4.

Use Example 18

The same procedure as defined in Use Example 1 was conducted except that the black magnetic iron oxide particles obtained in Example 18 was used, thereby producing a magnetic toner.

Various properties of the obtained magnetic toners are shown in Table 8.

Example 19

The reaction solution having a pH value of 7.8 which was obtained in Example 1 after oxidation of the surface coat composed of fine spinel iron oxide particles, was mixed with 53.5 g of an aqueous aluminum sulfate solution (octahydrate; produced by Kishida Kagaku Co., Ltd.), and stirred for about 10 minutes. Thereafter, an aqueous sodium hydroxide solution was added to the obtained reaction solution to adjust the pH value thereof to 7.0. The reaction solution was allowed to stand for 30 minutes and then washed with water, thereby obtaining about 2.5 kg of black magnetic iron oxide particles surface-coated with the aluminum compound.

10 kg of the thus obtained black magnetic iron oxide particles surface-coated with the aluminum compound were charged into a Simpson mix muller "Sand Mill MPUV-2" (manufactured by Matsumoto Chuzo Tekkosho Co., Ltd.) and subjected to compression, shearing and spatula-stroking at a linear load of 50 kg/cm for 60 minutes, thereby more uniformly coating the surface of each black magnetic iron oxide particle with the aluminum compound.

The thus obtained magnetic particles surface-coated with the aluminum compound had an average particle diameter of 0.20 μm; a coercive force value of 5.09 kA/m; a saturation magnetization value of 82.9 Am$^2$/kg; a BET specific surface area value of 8.7 m$^2$/g; an Al content of 0.24% by weight; a blackness (a* value) of +0.3; a charge amount of +5 μC/g; and a charge saturation time of 5 minutes.

Use Example 19

The same procedure as defined in Use Example 1 was conducted except that the magnetic particles obtained in Example 19 was used, thereby producing a magnetic toner.

The distribution condition of charge amount of the obtained magnetic toner was evaluated by the four-rank method (A, B, C and D), and determined to be Rank A, and the toner fogging was also evaluated by the four-rank method (A, B, C and D), and determined to be Rank A.

Example 20

The same procedure as defined in Example 19 was conducted except that amount of the silicon compound, the linear load and time were varied, thereby producing black magnetic iron oxide particles having the coating layer composed of the silicon compound.

Various properties of the obtained magnetic toners are shown in Table 4.

Use Example 20

The same procedure as defined in Use Example 1 was conducted except that the black magnetic iron oxide particles obtained in Example 20 was used, thereby producing a magnetic toner.

Various properties of the obtained magnetic toners are shown in Table 8.

Example 21

10 kg of the thus obtained black magnetic iron oxide particles obtained in Example 1 and 500 g of colloidal silica having a BET specific surface area of 170 m$^2$/g (tradename: "ST-40" produced by Nissan Kagaku Co., Ltd.; purity: 40% calculated as oxide) were charged into a Simpson mix muller "Sand Mill MPUV-2" (manufactured by Matsumoto Chuzo Tekkosho Co., Ltd.) and kneaded together at a linear load of 50 kg/cm for 60 minutes, thereby adhering fine silica particles onto the surface of each black magnetic iron oxide particle.

The thus obtained magnetic particles onto which the fine silica particle were adhered, had a BET specific surface area value of 10.5 m$^2$/g. The increment of BET specific surface area of the silica-adhered magnetic particles based on that of the non-adhered black magnetic iron oxide particles (those particles before adhering the fine silica particles thereto) (hereinafter referred to "ΔBET") was 2.5 m$^2$/g, and the ΔBET per unit weight (%) of the fine silica particles adhered was 1.3. Further, the obtained magnetic particles had a coercive force value of 2 5.09 kA/m; a saturation magnetization value of 82.1 Am$^2$/kg; a blackness (a* value) of +0.3; a charge saturation time of 4 minutes; and a flowability index of 65.

Use Example 21

The same procedure as defined in Use Example 1 was conducted except that the magnetic particles obtained in Example 21 was used, thereby producing a magnetic toner.

It was confirmed that the flowability index of the magnetic toner was 85. Further, after being allowed to stand under high-temperature (30° C.) and high-humidity (90%) conditions for 12 hours, the flowability index was 85 and the image density was 1.45.

Examples 22 to 23

The same procedure as defined in Example 21 was conducted except that kind and amount of oxide fine particles, the linear load and time were varied, thereby producing black magnetic iron oxide particles having the coating layer composed of the fine particles of an oxide.

Various properties of the obtained magnetic toners are shown in Table 5.

Use Examples 22 to 23

The same procedure as defined in Use Example 1 was conducted except that the black magnetic iron oxide particles obtained in Examples 22 to 23 was used, thereby producing a magnetic toner.

Various properties of the obtained magnetic toners are shown in Table 9.

TABLE 1

| Examples and Comparative Examples | Production of core particles | | |
|---|---|---|---|
| | Ferrous salt solution | Aqueous alkali solution | Alkali equivalent ratio |
| Example 1 | Ferrous sulfate | sodium hydroxide | 0.95 |
| Example 2 | Ferrous sulfate | sodium hydroxide | 0.95 |
| Example 3 | Ferrous sulfate | sodium hydroxide | 0.95 |
| Example 4 | Ferrous sulfate | sodium hydroxide | 0.95 |
| Example 5 | Ferrous sulfate | sodium hydroxide | 0.95 |
| Example 6 | Ferrous sulfate | sodium hydroxide | 0.95 |
| Example 7 | Ferrous sulfate | sodium hydroxide | 0.95 |
| Example 8 | Ferrous sulfate | sodium hydroxide | 0.97 |
| Example 9 | Ferrous sulfate | sodium hydroxide | 0.91 |
| Example 10 | Ferrous sulfate | sodium carbonate | 0.95 |
| Example 11 | Ferrous sulfate | sodium hydroxide | 0.95 |
| Example 12 | Ferrous sulfate | sodium hydroxide | 0.95 |
| Example 13 | Ferrous sulfate | sodium hydroxide | 0.95 |
| Comparative Example 1 | Ferrous sulfate | sodium hydroxide | 0.95 |
| Comparative Example 2 | Ferrous sulfate | sodium hydroxide | 0.80 |
| Comparative Example 3 | Ferrous sulfate | sodium hydroxide | 1.01 |
| Comparative Example 4 | Ferrous sulfate | sodium hydroxide | 0.95 |
| Comparative Example 5 | Ferrous sulfate | sodium hydroxide | 0.95 |
| Comparative Example 6 | Ferrous sulfate | sodium hydroxide | 0.95 |

TABLE 1-continued

| Examples and Comparative Examples | Production of core particles | |
|---|---|---|
| | pH value | Temperature (° C.) |
| Example 1 | 6.7 | 90 |
| Example 2 | 6.7 | 95 |
| Example 3 | 6.7 | 90 |
| Example 4 | 6.7 | 90 |
| Example 5 | 6.7 | 90 |
| Example 6 | 6.7 | 90 |
| Example 7 | 6.7 | 90 |
| Example 8 | 6.9 | 90 |
| Example 9 | 6.6 | 90 |
| Example 10 | 6.6 | 90 |
| Example 11 | 6.6 | 90 |
| Example 12 | 6.7 | 90 |
| Example 13 | 6.7 | 90 |
| Comparative Example 1 | 6.7 | 90 |
| Comparative Example 2 | 6.5 | 90 |
| Comparative Example 3 | 10.5 | 90 |
| Comparative Example 4 | 6.7 | 90 |
| Comparative Example 5 | 6.8 | 90 |
| Comparative Example 6 | 6.7 | 90 |

| Examples and Comparative Examples | Surface oxidation of core particles | | |
|---|---|---|---|
| | pH value | Temperature (° C.) | Time (min) |
| Example 1 | 4.2 | 90 | 30 |
| Example 2 | 4.2 | 95 | 30 |
| Example 3 | 4.2 | 90 | 15 |
| Example 4 | 4.2 | 90 | 45 |
| Example 5 | 4.2 | 90 | 30 |
| Example 6 | 4.2 | 90 | 30 |
| Example 7 | 4.2 | 90 | 30 |
| Example 8 | 4.3 | 90 | 60 |
| Example 9 | 4.1 | 90 | 5 |
| Example 10 | 4.2 | 90 | 30 |
| Example 11 | 4.2 | 90 | 30 |
| Example 12 | 4.2 | 90 | 30 |
| Example 13 | 4.2 | 90 | 30 |
| Comparative Example 1 | — | — | — |
| Comparative Example 2 | — | — | — |
| Comparative Example 3 | — | — | — |
| Comparative Example 4 | — | — | — |
| Comparative Example 5 | 4.2 | 90.0 | 30 |
| Comparative Example 6 | — | — | — |

| Examples and Comparative Examples | Formation of fine spinel iron oxide particles (surface coat) | | |
|---|---|---|---|
| | Aqueous alkali solution Kind | pH value | Temperature (° C.) |
| Example 1 | Sodium hydroxide | 7.8 | 90 |
| Example 2 | Sodium hydroxide | 7.8 | 95 |
| Example 3 | Sodium hydroxide | 7.8 | 90 |
| Example 4 | Sodium hydroxide | 7.8 | 90 |
| Example 5 | Sodium hydroxide | 7.8 | 90 |
| Example 6 | Sodium hydroxide | 7.8 | 90 |
| Example 7 | Sodium hydroxide | 7.8 | 90 |
| Example 8 | Sodium hydroxide | 7.7 | 90 |
| Example 9 | Sodium hydroxide | 7.8 | 90 |
| Example 10 | Sodium carbonate | 7.8 | 90 |
| Example 11 | Sodium hydroxide | 7.8 | 90 |
| Example 12 | Sodium hydroxide | 7.8 | 90 |
| Example 13 | Sodium hydroxide | 7.8 | 90 |
| Comparative Example 1 | Sodium hydroxide | 11.5 | 90 |
| Comparative Example 2 | Sodium hydroxide | 7.6 | 90 |
| Comparative Example 3 | — | — | — |
| Comparative Example 4 | Sodium hydroxide | 7.8 | 90 |
| Comparative Example 5 | Sodium hydroxide | 11.5 | 90 |
| Comparative Example 6 | Sodium hydroxide | 11.5 | 90 |

| Examples and Comparative Examples | Oxidation of surface coat | | |
|---|---|---|---|
| | pH value | Temperature (° C.) | Time (min) |
| Example 1 | 7.8 | 90 | 60 |
| Example 2 | 7.8 | 95 | 60 |
| Example 3 | 7.8 | 90 | 60 |
| Example 4 | 7.8 | 90 | 60 |
| Example 5 | 7.8 | 90 | 60 |
| Example 6 | 7.8 | 90 | 60 |
| Example 7 | 7.8 | 90 | 60 |
| Example 8 | 7.7 | 90 | 30 |
| Example 9 | 7.8 | 90 | 120 |
| Example 10 | 7.8 | 90 | 60 |
| Example 11 | 7.8 | 90 | 60 |
| Example 12 | 7.8 | 90 | 60 |
| Example 13 | 7.8 | 90 | 60 |
| Comparative Example 1 | — | — | — |
| Comparative Example 2 | 7.6 | 90 | 60 |
| Comparative Example 3 | 7.7 | 90 | 100 |
| Comparative Example 4 | 7.8 | 90 | 100 |
| Comparative Example 5 | 7.8 | 90 | 100 |
| Comparative Example 6 | — | — | — |

TABLE 2

| Examples and Comparative Examples | Particle diameter ($\mu m$) | Aspect Ratio | Specific surface area ($m^2/g$) |
|---|---|---|---|
| Example 1 | 0.20 | 1.1:1 | 8.0 |
| Example 2 | 0.20 | 1.1:1 | 8.2 |
| Example 3 | 0.20 | 1.1:1 | 8.0 |
| Example 4 | 0.20 | 1.1:1 | 8.0 |
| Example 5 | 0.25 | 1.05:1 | 6.0 |
| Example 6 | 0.15 | 1.15:1 | 9.0 |
| Example 7 | 0.10 | 1.2:1 | 12.5 |
| Example 8 | 0.20 | 1.25:1 | 8.5 |
| Example 9 | 0.20 | 1.1:1 | 8.0 |
| Example 10 | 0.20 | 1.1:1 | 8.0 |
| Example 11 | 0.20 | 1.1:1 | 8.0 |
| Example 12 | 0.20 | 1.1:1 | 8.0 |
| Example 13 | 0.20 | 1.1:1 | 8.0 |
| Comparative Example 1 | 0.20 | 1.1:1 | 8.0 |
| Comparative Example 2 | 0.20 | 1.1:1 | 8.1 |
| Comparative Example 3 | 0.19 | 1.45:1 | 7.8 |
| Comparative | 0.20 | 1.1:1 | 8.0 |

TABLE 2-continued

| | | | |
|---|---|---|---|
| Example 4 | | | |
| Comparative Example 5 | 0.20 | 1.1:1 | 8.1 |
| Comparative Example 6 | 0.20 | 1.1:1 | 7.9 |

| Examples and Comparative Examples | Magnetic properties (796 kA/m) | | Soluble Na content (ppm) | Al content (wt. %) |
|---|---|---|---|---|
| | Coercive force value (kA/m) | Saturation magnetization value (Am²/Kg) | | |
| Example 1 | 5.17 | 83.5 | 10 | — |
| Example 2 | 5.09 | 83.0 | 10 | — |
| Example 3 | 5.17 | 84.5 | 10 | — |
| Example 4 | 5.17 | 83.0 | 10 | — |
| Example 5 | 3.18 | 85.0 | 10 | — |
| Example 6 | 6.37 | 84.0 | 10 | — |
| Example 7 | 8.36 | 82.5 | 10 | — |
| Example 8 | 6.37 | 85.0 | 10 | — |
| Example 9 | 5.57 | 83.5 | 10 | — |
| Example 10 | 5.17 | 84.0 | 50 | — |
| Example 11 | 5.17 | 84.0 | 50 | — |
| Example 12 | 5.17 | 84.0 | 50 | 0.02 |
| Example 13 | 5.17 | 84.0 | 50 | 0.25 |
| Comparative Example 1 | 5.17 | 85.5 | 10 | — |
| Comparative Example 2 | 5.41 | 82.5 | 10 | — |
| Comparative Example 3 | 6.37 | 86.0 | 10 | — |
| Comparative Example 4 | 5.17 | 85.0 | 10 | — |
| Comparative Example 5 | 5.33 | 85.5 | 10 | — |
| Comparative Example 6 | 5.01 | 81.5 | 10 | — |

| Examples and Comparative Examples | FeO content | | |
|---|---|---|---|
| | Surface layer (wt. %) | Core particle (wt. %) | Whole particle (wt. %) |
| Example 1 | 10.7 | 31.0 | 20.8 |
| Example 2 | 9.2 | 28.1 | 18.3 |
| Example 3 | 12.7 | 32.7 | 22.1 |
| Example 4 | 9.2 | 28.1 | 18.3 |
| Example 5 | 10.5 | 32.0 | 21.6 |
| Example 6 | 10.3 | 29.7 | 20.0 |
| Example 7 | 9.5 | 28.1 | 18.4 |
| Example 8 | 10.5 | 30.7 | 20.6 |
| Example 9 | 11.4 | 29.8 | 20.1 |
| Example 10 | 10.5 | 30.2 | 20.3 |
| Example 11 | 10.6 | 30.2 | 20.3 |
| Example 12 | 10.4 | 30.3 | 20.3 |
| Example 13 | 10.3 | 30.5 | 20.4 |
| Comparative Example 1 | 18.0 | 32.6 | 22.4 |
| Comparative Example 2 | 10.5 | 32.9 | 20.4 |
| Comparative Example 3 | 20.1 | 33.5 | 23.1 |
| Comparative Example 4 | 19.5 | 31.6 | 22.2 |
| Comparative Example 5 | 19.8 | 31.4 | 21.6 |
| Comparative Example 6 | 12.1 | 24.1 | 16.5 |

| Examples and Comparative Examples | Surface layer | | |
|---|---|---|---|
| | Surface coat Thickness (Å) | Thickness (Å) | percentage of thickness to radius (%) |
| Example 1 | 17.2 | 34.5 | 3.5 |
| Example 2 | 17.2 | 34.5 | 3.5 |
| Example 3 | 17.2 | 34.5 | 3.5 |
| Example 4 | 17.2 | 34.5 | 3.5 |
| Example 5 | 21.5 | 43.1 | 3.5 |
| Example 6 | 13.0 | 25.9 | 3.5 |
| Example 7 | 8.6 | 17.3 | 3.5 |
| Example 8 | 10.4 | 34.5 | 3.5 |
| Example 9 | 31.0 | 34.5 | 3.5 |
| Example 10 | 17.2 | 34.5 | 3.5 |
| Example 11 | 17.2 | 34.5 | 3.5 |
| Example 12 | 17.2 | 34.5 | 3.5 |
| Example 13 | 17.2 | 34.5 | 3.5 |
| Comparative Example 1 | 17.2 | 34.5 | 3.5 |
| Comparative Example 2 | 71.7 | 71.7 | 7.2 |
| Comparative Example 3 | 0.0 | 0.0 | 0.0 |
| Comparative Example 4 | 17.3 | 17.3 | 1.7 |
| Comparative Example 5 | — | — | — |
| Comparative Example 6 | 17.2 | 34.5 | 3.5 |

| Examples and Comparative Examples | Blackness a* value | Dispersibility 44 μm mesh residue (%) | Electrical properties Charge saturation time (min) |
|---|---|---|---|
| Example 1 | 0.5 | 0 | 5 |
| Example 2 | 0.7 | 0 | 5 |
| Example 3 | 0.3 | 3 | 15 |
| Example 4 | 0.8 | 0 | 10 |
| Example 5 | 0.2 | 0 | 10 |
| Example 6 | 0.7 | 0 | 5 |
| Example 7 | 1.0 | 3 | 10 |
| Example 8 | 0.3 | 5 | 5 |
| Example 9 | 0.5 | 3 | 15 |
| Example 10 | 0.4 | 0 | 5 |
| Example 11 | 0.5 | 3 | 10 |
| Example 12 | 0.4 | 0 | 5 |
| Example 13 | 0.3 | 0 | 10 |
| Comparative Example 1 | 0.2 | 10 | 25 |
| Comparative Example 2 | 1.6 | 5 | 5 |
| Comparative Example 3 | 0.3 | 15 | 25 |
| Comparative Example 4 | 0.3 | 10 | 25 |
| Comparative Example 5 | 0.2 | 10 | 20 |
| Comparative Example 6 | 2.1 | 5 | 5 |

TABLE 3

| Examples | Particles to be treated | Coating treatment with organic compound having hydrophobic group Kind |
|---|---|---|
| Example 14 | Magnetite particles obtained in Example 1 | Silane-based coupling agent ("A-187" produced by Nippon Unicar Co., Ltd.) |
| Example 15 | Magnetite particles obtained in Example 1 | Titanium-based coupling agent ("PLAIN-ACT TTS" produced by Ajinomoto Co., Ltd.) |
| Example 16 | Magnetite particles obtained in Example | Silane-based coupling agent ("KBM-1003" |

TABLE 3-continued

|  | 1 | produced by Shinetsu Kagaku Co., Ltd.) |
|---|---|---|

Coating treatment with organic compound having hydrophobic group

| Examples | Amount treated (wt. part) | Treating apparatus | Linear load (kg/cm) | Operating time (min) |
|---|---|---|---|---|
| Example 14 | 2 | Simpson mix muller MPUV-2 | 50 | 60 |
| Example 15 | 4 | Simpson mix muller MPUV-2 | 40 | 60 |
| Example 16 | 2 | Simpson mix muller MPUV-2 | 60 | 45 |

| Examples | BET specific surface area value ($m^2/g$) | Coercive force value (kA/m) | Saturation magnetization value ($Am^2/kg$) | Blackness a* value |
|---|---|---|---|---|
| Example 14 | 7.5 | 5.17 | 81.9 | 0.4 |
| Example 15 | 5.5 | 5.09 | 80.7 | 0.4 |
| Example 16 | 6.8 | 5.09 | 82.1 | 0.4 |

| Examples | Electrical properties Charge saturation time (min) | Dispersibility (compatibility) Liquid absorption (ml/100 g) | Gloss of molded resin (incident and reflection angles: 20°) (%) |
|---|---|---|---|
| Example 14 | 2 | 6.5 | 92.5 |
| Example 15 | 1 | 5.6 | 94.0 |
| Example 16 | 1.5 | 6.2 | 93.0 |

TABLE 4

| Examples | Particles to be treated | Coating treatment with silicon compound or aluminum compound Kind |
|---|---|---|
| Example 17 | Magnetite particles obtained in Example 1 | Water glass #3 |
| Example 18 | Magnetite particles obtained in Example 1 | Water glass #3 |
| Example 19 | Magnetite particles obtained in Example 1 | Aluminum sulfate |
| Example 20 | Magnetite particles obtained in Example 1 | Aluminum sulfate |

Coating treatment with silicon compound or aluminum compound

| Examples | Amount treated (wt. part) | Treating apparatus | Linear load (kg/cm) | Operating time (min) |
|---|---|---|---|---|
| Example 17 | 0.23 | Simpson mix muller MPUV-2 | 50 | 60 |
| Example 18 | 0.1 | Simpson mix muller MPUV-2 | 60 | 45 |
| Example 19 | 0.25 | Simpson mix muller MPUV-2 | 40 | 60 |
| Example 20 | 0.07 | Simpson mix muller MPUV-2 | 50 | 45 |

| Examples | BET specific surface area value ($m^2/g$) | Kind of coating material | Percentage of $SiO_2$ to Al (wt. %) | Coercive force value (kA/m) | Saturation magnetization value ($Am^2/kg$) |
|---|---|---|---|---|---|
| Example 17 | 8.3 | S | 0.22 | 5.09 | 83.1 |
| Example 18 | 8.1 | S | 0.10 | 5.17 | 83.3 |
| Example 19 | 8.7 | A | 0.24 | 5.09 | 82.9 |
| Example 20 | 8.2 | A | 0.07 | 5.17 | 83.4 |

| Examples | Blackness a* value | Electrical properties Charge amount ($\mu C/g$) | Charge saturation time (min) |
|---|---|---|---|
| Example 17 | 0.2 | −20 | 5 |
| Example 18 | 0.3 | −15 | 5 |
| Example 19 | 0.3 | +5 | 5 |
| Example 20 | 0.3 | +2 | 5 |

Note;
S: Oxide of silicon
A: Hydroxide of aluminum

TABLE 5

| Examples | Particles to be treated | Coating treatment with fine oxide particles Kind |
|---|---|---|
| Example 21 | Magnetite particles obtained in Example 1 | Fine silica particles ("ST-40" produced by Nissan Kagaku Co., Ltd.) |
| Example 22 | Magnetite particles obtained in Example 1 | Fine silica particles ("ST-40" produced by Nissan Kagaku Co., Ltd.) |
| Example 23 | Magnetite particles obtained in Example 1 | Fine alumina particles ("AS-520" produced by Nissan Kagaku Co., Ltd.) |

Coating treatment with fine oxide particles

| Examples | Amount treated (wt. part) | Treating apparatus | Linear load (kg/cm) | Operating time (min) |
|---|---|---|---|---|
| Example 21 | 2 | Simpson mix muller MPUV-2 | 50 | 6D |
| Example 22 | 0.5 | Simpson mix muller MPUV-2 | 60 | 60 |
| Example 23 | 1 | Simpson mix muller MPUV-2 | 80 | 60 |

| Examples | BET specific surface area value ($m^2/g$) | ΔBET (increment of BET specific surface area) (1) ($m^2/g$) | Amount of fine oxide particles adhered (2) (wt. %) |
|---|---|---|---|
| Example 21 | 10.5 | 2.5 | 1.9 |
| Example 22 | 8.8 | 0.8 | 0.5 |
| Example 23 | 9.3 | 1.3 | 1.0 |

TABLE 5-continued

| Examples | ΔBET per unit weight (%) of fine particles adhered (1)/(2) | Magnetic properties (796 kA/m) | |
|---|---|---|---|
| | | Coercive force value (kA/m) | Saturation magnetization value (Am²/kg) |
| Example 21 | 1.3 | 5.09 | 82.1 |
| Example 22 | 1.6 | 5.17 | 83.1 |
| Example 23 | 1.3 | 5.17 | 82.8 |

| Examples | Blackness a* value | Electrical properties Charge saturation time (min) | Flowability Flowability index (ml/100 g) |
|---|---|---|---|
| Example 21 | 0.3 | 4 | 65 |
| Example 22 | 0.4 | 5 | 55 |
| Example 23 | 0.4 | 4 | 60 |

TABLE 6

| Use Examples and Comparative Use Examples | Kind of black magnetic iron oxide particles used | Dispersibility of black magnetic iron oxide particles in toner | Initial image density under high-temperature and high-humidity conditions |
|---|---|---|---|
| Use Example 1 | Example 1 | A | 1.55 |
| Use Example 2 | Example 2 | A | 1.5 |
| Use Example 3 | Example 3 | B | 1.4 |
| Use Example 4 | Example 4 | A | 1.4 |
| Use Example 5 | Example 5 | A | 1.45 |
| Use Example 6 | Example 6 | A | 1.45 |
| Use Example 7 | Example 7 | B | 1.4 |
| Use Example 8 | Example 8 | B | 1.4 |
| Use Example 9 | Example 9 | B | 1.4 |
| Use Example 10 | Example 10 | A | 1.5 |
| Use Example 11 | Example 11 | B | 1.4 |
| Use Example 12 | Example 12 | A | 1.55 |
| Use Example 13 | Example 13 | A | 1.45 |
| Comparative Use Example 1 | Comparative Example 1 | C | 1.25 |
| Comparative Use Example 2 | Comparative Example 2 | B | 1.25 |
| Comparative Use Example 3 | Comparative Example 3 | D | 1.25 |
| Comparative Use Example 4 | Comparative Example 4 | C | 1.3 |
| Comparative Use Example 5 | Comparative Example 5 | C | 1.3 |
| Comparative Use Example 6 | Comparative Example 6 | B | 1.2 |

TABLE 7

| Use Examples, Comparative Use Examples and Reference Use Example | Kind of black magnetic iron oxide particles used | Dispersibility of black magnetic iron oxide particles in toner |
|---|---|---|
| Use Example 14 | Example 14 | A |
| Use Example 15 | Example 15 | A |
| Use Example 16 | Example 16 | A |

| Use Examples, Comparative Use Examples and Reference | Initial image density under high-temperature and high- | Image density after being allowed to stand under high-temperature and high-humidity |
|---|---|---|
| Use Example | humidity conditions | conditions |
| Use Example 14 | 1.55 | 1.45 |
| Use Example 15 | 1.60 | 1.50 |
| Use Example 16 | 1.55 | 1.45 |

TABLE 8

| Use Examples, Comparative Use Examples and Reference Use Example | Kind of black magnetic iron oxide particles used | Distribution of toner charge | Toner fogging |
|---|---|---|---|
| Use Example 17 | Example 17 | A | A |
| Use Example 18 | Example 18 | A | A |
| Use Example 19 | Example 19 | A | A |
| Use Example 20 | Example 20 | A | A |

TABLE 9

| Use Examples, Comparative Use Examples and Reference Use Example | Kind of black magnetic iron oxide particles used | Flowability index of toner |
|---|---|---|
| Use Example 21 | Example 21 | 85 |
| Use Example 22 | Example 22 | 80 |
| Use Example 23 | Example 23 | 80 |

| Use Examples, Comparative Use Examples and Reference Use Example | Flowability index after being allowed to stand under high-temperature and high-humidity conditions | Image density after being allowed to stand under high-temperature and high-humidity conditions |
|---|---|---|
| Use Example 21 | 75 | 1.45 |
| Use Example 22 | 70 | 1.4 |
| Use Example 23 | 70 | 1.4 |

What is claimed is:

1. Black magnetic iron oxide particles having an average particle diameter of 0.1 to 0.3 μm, comprising:

black spinel iron oxide particles as core particles; and a surface coating layer comprising fine spinel iron oxide particles formed on the surface of each core particle, wherein a surface layer portion has a depth of about 3.5% of a radius of the black magnetic iron oxide particle, the FeO content in the surface layer portion is 8 to 14% by weight based on the weight of Fe contained in the surface layer portion, and the FeO content in a central portion of black magnetic iron oxide particle as a remaining portion excluding the surface layer portion, is 27 to 34% by weight based on the weight of Fe contained in said central portion.

2. Black magnetic iron oxide particles according to claim 1, wherein the content of FeO in said black magnetic iron oxide particles is 18.0 to 22.5% by weight based on the total weight of Fe in said black magnetic iron oxide particles.

3. Black magnetic iron oxide particles according to claim 1 which have an aspect ratio of less than 1.4:1.

4. Black magnetic iron oxide particles according to claim 1 which have a composition represented by the general formula:

$(FeO)_x \cdot Fe_2O_3$ wherein x is more than 0 and not more than 1.

5. Black magnetic iron oxide particles according to claim 1 which have a BET specific surface area of 5 to 15 m²/g, a blackness (a* value) of not more than 1.0, a soluble sodium salt content of not more than 100 ppm and a saturation magnetization value of 81.0 to 86.0 Am²/kg.

6. Black magnetic iron oxide particles according to claim 1, which have a coating formed on the surface coating layer of each black magnetic iron oxide particle, comprising an organic compound having a hydrophobic group.

7. Black magnetic iron oxide particles according to claim 6, wherein said organic compound having a hydrophobic group is a titanate-based coupling agent, a silane-based coupling agent or a surfactant.

8. Black magnetic iron oxide particles according to claim 7, wherein the coating amount of said organic compound having a hydrophobic group is 0.5 to 5 parts by weight based on 100 parts by weight of said black magnetic iron oxide particles to be coated.

9. Black magnetic iron oxide particles according to claim 8, wherein said titanate-based coupling agent is at least one compound selected from the group consisting of isopropyl triisostearoyl titanate, isopropyl tridecylbenzene sulfonyl titanate, isopropyl tris(dioctyl pyrophosphate)titanate, bis(dioctylpyrophosphate)oxyacetate titanate and bis(dioctylpyrophosphate)ethylene titanate; said silane-based coupling agent is at least one compound selected from the group consisting of vinyl trimethoxysilane, γ-glycidoxypropyl trimethoxysilane, γ-methacyloxypropyl methoxysilane, phenyl trimethoxysilane and decyl triethoxysilane; and said surfactant is at least one selected from the group consisting of a phosphate-based anionic surfactant, a fatty acid ester-based nonionic surfactant and a natural fat and oil derivative of alkyl amines.

10. Black magnetic iron oxide particles according to claim 1, which have a coating formed on the surface coating layer of each black magnetic iron oxide particle, comprising an aluminum compound, a silicon compound or a mixture thereof.

11. Black magnetic iron oxide particles according to claim 10, wherein said aluminum compound is at least one compound selected from the group consisting of $Al_2O_3$, $AlO(OH)$, $Al(OH)_3$ and an aluminum oxide hydrate represented by $Al_2O_3 \cdot nH_2O$; and said silicon compound is at least one compound selected from the group consisting of $SiO_2$, $Si(OH)_4$ and a silicon oxide hydrate represented by $SiO_2 \cdot nH_2O$.

12. Black magnetic iron oxide particles according to claim 10, wherein the coating amount of said aluminum compound is 0.01 to 0.3% by weight, calculated as Al element, based on the weight of said black magnetic iron oxide particles to be coated; and the coating amount of said silicon compound is 0.01 to 0.3% by weight, calculated as $SiO_2$, based on the weight of said black magnetic iron oxide particles to be coated.

13. Black magnetic iron oxide particles according to claim 1, which have a coating formed on the surface coating layer of each black magnetic iron oxide particle, comprising fine particles of an oxide of at least one element selected from the group consisting of Al, Si, Zr and Ti.

14. Black magnetic iron oxide particles according to claim 13, wherein the amount of said oxide fine particles is 0.25 to 5% by weight, calculated as an oxide, based on the weight of said black magnetic iron oxide particles coated.

15. Black magnetic iron oxide particles according to claim 13, wherein said fine oxide particles are themselves surface-coated with at least one compound selected from the group consisting of methyl silane, trimethyl silane and octyl silane.

16. A process for producing the black magnetic iron oxide particles as defined in claim 1, comprising:

(a) passing an oxygen-containing gas through an aqueous ferrous salt reaction solution containing ferrous hydroxide colloid obtained by reacting an aqueous ferrous salt solution with an aqueous alkali solution having an alkali concentration of less than one equivalent based on $Fe^{2+}$ contained in said aqueous ferrous salt solution, to produce a reaction solution of a pH of 4.0 to 5.0, containing black spinel iron oxide particles as core particles;

(b) successively passing an oxygen-containing gas through said reaction solution to surface-oxidize said core particles;

(c) adding an aqueous alkali hydroxide solution to the reaction solution obtained after the surface-oxidation of the core particles to adjust the pH of said reaction solution to 7.0 to 8.0;

(d) passing an oxygen-containing gas through the resultant reaction solution, to form a surface coat comprising fine spinel iron oxide particles on the surface of each core particle; and (e) successively passing an oxygen-containing gas through the reaction solution to oxidize said surface coat comprising fine spinel iron oxide particles.

17. A magnetic toner comprising the black magnetic iron oxide particles as defined in claim 1.

18. Black magnetic iron oxide particles having an average particle diameter of 0.1 to 0.3 μm, comprising:

black spinel iron oxide particles as core particles; and a surface coating layer comprising spinel iron oxide particles formed on the surface of each core particle, wherein the surface coating layer has a depth of about 3.5% of a radius of the core particles, the FeO content of a surface layer is 8 to 14% by weight based on the weight of Fe contained in the surface coating layer, said black magnetic iron oxide particles produced by:

(a) passing an oxygen-containing gas through an aqueous ferrous salt reaction solution containing ferrous hydroxide colloid obtained by reacting an aqueous ferrous salt solution with an aqueous alkali solution having an alkali concentration of less than one equivalent based on $Fe^{2+}$ contained in said aqueous ferrous salt solution, to produce a reaction solution of a pH of 4.0 to 5.0, containing black spinel iron oxide particles as core particles;

(b) passing an oxygen-containing gas through a reaction solution of a pH of 4.0 to 5.0, containing the black spinel iron oxide particles as core particles to surface-oxidize said core particles, (c) adding an aqueous alkali hydroxide solution to the reaction solution obtained to adjust the pH to 7.0 to 8.0, (d) passing an oxygen-containing gas through the resultant reaction solution, to form a surface coat comprising spinel iron oxide particles on the surface of each core particle, and (e) successively passing an oxygen-containing gas through the reaction solution to oxidize said surface coat comprising spinel iron oxide particles.

* * * * *